US012732848B2

(12) United States Patent
Kim et al.

(10) Patent No.: US 12,732,848 B2
(45) Date of Patent: Sep. 8, 2026

(54) MEASUREMENT REPORT METHOD FOR FREQUENCY SELECTION OF ELECTRONIC DEVICE, AND ELECTRONIC DEVICE

(71) Applicant: Samsung Electronics Co., Ltd., Suwon-si (KR)

(72) Inventors: Junsuk Kim, Suwon-si (KR); Hyoungjoo Lee, Suwon-si (KR); Minho Yang, Suwon-si (KR); Yonggue Han, Suwon-si (KR); Taeyoon Kim, Suwon-si (KR); Euichang Jung, Suwon-si (KR); Chaiman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 18/365,605

(22) Filed: Aug. 4, 2023

(65) Prior Publication Data

US 2023/0388842 A1 Nov. 30, 2023

Related U.S. Application Data

(63) Continuation of application No. PCT/KR2022/001586, filed on Jan. 28, 2022.

(30) Foreign Application Priority Data

Feb. 5, 2021 (KR) ........................ 10-2021-0016635

(51) Int. Cl.

*H04W 24/10* (2009.01)
*H04B 17/318* (2015.01)
*H04W 24/08* (2009.01)

(52) U.S. Cl.

CPC .......... *H04W 24/10* (2013.01); *H04B 17/328* (2023.05); *H04W 24/08* (2013.01)

(58) Field of Classification Search

CPC ..... H04W 24/10; H04W 24/08; H04W 76/16; H04W 36/0085; H04B 17/328;

(Continued)

(56) References Cited

U.S. PATENT DOCUMENTS 8,675,584 B2 * 3/2014 Lee ........................ H04L 5/001 370/329
2009/0197603 A1 8/2009 Ji et al.

(Continued)

FOREIGN PATENT DOCUMENTS

JP 2017055257 A 3/2017
KR 20120099721 A 9/2012

(Continued)

OTHER PUBLICATIONS

Extended European Search Report dated May 23, 2024 issued in European Patent Application No. PCT/KR2022001586.

(Continued)

*Primary Examiner* — Vinncelas Louis
(74) *Attorney, Agent, or Firm* — Nixon & Vanderhye P.C.

(57) ABSTRACT

An electronic device according to various embodiments comprises: a memory and at least one communication processor, the at least one communication processor configured to: confirm a plurality of specified measurement objects (MOs) for measuring the downlink performance of a second communication network, while connected to a first base station of a first communication network; confirm measurement priorities of the plurality of specified MOs based at least on information relating to the transmission/reception performance of signals having a frequency corresponding to the respective plurality of MOs and stored in the memory; measure the reception signal strength with respect to at least one MO from a signal transmitted from a second base station of the second communication network, based on the mea- (Continued)

surement priorities of the plurality of MOs; and control the electronic device to transmit at least one measurement report (MR) to the first base station of the first communication network, on the basis of the measurement result of the reception signal strength with respect to the at least one MO.

20 Claims, 16 Drawing Sheets

(58) Field of Classification Search
CPC .. H04B 17/253; H04B 17/318; H04B 17/336; H04L 5/001; G01R 29/105
See application file for complete search history.

(56) References Cited

U.S. PATENT DOCUMENTS

| | | | | |
|---|---|---|---|---|
| 2010/0216474 | A1* | 8/2010 | Park | H04W 24/10 455/436 |
| 2012/0213153 | A1 | 8/2012 | Faurie et al. | |
| 2013/0109372 | A1* | 5/2013 | Ekici | H04W 24/10 455/422.1 |
| 2013/0288664 | A1 | 10/2013 | Bodog et al. | |
| 2015/0327286 | A1 | 11/2015 | Yiu et al. | |
| 2017/0064576 | A1 | 3/2017 | Kusashima et al. | |
| 2017/0118669 | A1 | 4/2017 | Qin | |
| 2017/0366998 | A1 | 12/2017 | Lee et al. | |
| 2019/0140752 | A1 | 5/2019 | Annam et al. | |
| 2019/0364469 | A1* | 11/2019 | Siomina | H04W 36/0085 |
| 2020/0221353 | A1 | 7/2020 | Tamura et al. | |
| 2021/0306885 | A1 | 9/2021 | Hou et al. | |
| 2022/0260625 | A1* | 8/2022 | Gao | G01R 29/105 |

FOREIGN PATENT DOCUMENTS

| | | | |
|---|---|---|---|
| KR | 20130132610 | A | 12/2013 |
| KR | 20160093533 | A | 8/2016 |
| KR | 20170003966 | A | 1/2017 |
| KR | 20170097702 | A | 8/2017 |
| WO | 2013/050949 | | 4/2013 |
| WO | 2020063525 | A1 | 4/2020 |

OTHER PUBLICATIONS

3GPP TSG-RAN2, "Adding E-UTRA into Measured Results on RACH", Meeting Notes, Meeting #78, May 21-25, 2012, 6 pages.

3GPP; TSG RAN; Evolved Universal Terrestrial Radio Access (E-UTRA) and NR; Multi-connectivity;, 37.340, V16.4.0, Jan. 6, 2021, 86 pages.

3GPP; TSG RAN; Evolved Universal Terrestrial Radio Access (E-UTRA); Radio Resource Control (RRC); Protocol specification, 36.331, V16.3.0, Jan. 6, 2021, 1086 pages.

International Search Report for PCT/KR2022/001586 mailed May 3, 2022, 3 pages.

Written Opinion of the ISA for PCT/KR2022/001586 mailed May 3, 2022, 4 pages.

Korean Office Action issued Sep. 19, 2025 in corresponding Korean Patent Application No. 10-2021-0016635.

* cited by examiner

MO#0 MO#1 MO#2 MO#3 MO#4 MO#5 MO#6 MO#7

CC#0 CC#1 CC#2 CC#3 CC#4 CC#5 CC#6 CC#7

MR Report

UE Downlink CCs (800MHz - Total Bandwidth)

CC#0 CC#1 CC#2 CC#3 CC#4 CC#5 CC#6 CC#7

UE SpCell (100MHz - 1CC)

UE Uplink CCs (200MHz - 2CCs)

MEASUREMENT REPORT METHOD FOR FREQUENCY SELECTION OF ELECTRONIC DEVICE, AND ELECTRONIC DEVICE

CROSS-REFERENCE TO RELATED APPLICATIONS

This application is a continuation of International Application No. PCT/KR2022/001586 designating the United States, filed on Jan. 28, 2022, in the Korean Intellectual Property Receiving Office and claiming priority to Korean Patent Application No. 10-2021-0016635, filed on Feb. 5, 2021, in the Korean Intellectual Property Office, the disclosures of which are incorporated by reference herein in their entireties.

BACKGROUND

Field

The disclosure relates to a measurement report method of selecting a frequency by an electronic device and the electronic device.

Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a “beyond 4G network” communication system or a “post LTE” system.

The 5G communication system is considered to be implemented in higher frequency bands (e.g., 6-60 GHz bands and mmWave bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

A 5G wireless communication system operating a wide frequency band may provide a higher data transmission rate by transmitting data through a plurality of component carriers (CCs) using a carrier aggregation (CA) scheme. Among a plurality of CCs supporting the CA, a CC corresponding to an SpCell may transmit uplink data or uplink control data and thus perform a relatively important function compared to other CCs. The CC may be determined by a base station (BS) on the basis of a measurement result of a measurement object (MO) corresponding to each CC and a measurement report (MR) corresponding to a report on the measurement result of the MO. For example, when the BS cannot know in advance time points at which MRs of a plurality of MOs provided to the electronic device are received and orders of the MRs, the BS may configure a CC corresponding to an MO for which the electronic device first transmits an MR as an SpCell. When the transmission/reception performance of the electronic device in the frequency band of the CC corresponding to the MO for which the MR is transmitted is relatively lower than other CCs, the CC having the relatively low performance may be configured as the SpCell.

SUMMARY

Embodiments of the disclosure may provide a measurement report method of selecting a frequency by an electronic device, and the electronic device for configuring a measurement priority of the MO on the basis of the transmission/reception performance of the electronic device when a 5G network supports CA.

Embodiments of the disclosure may provide a measurement report method of selecting a frequency by an electronic device, and the electronic device for configuring a report priority of the MR for measurement of the MO on the basis of the transmission/reception performance of the electronic device when a 5G network (for example, a communication network supporting an mmWave band) supports CA.

According to various example embodiments, an electronic device includes: a memory and at least one communication processor, wherein the at least one communication processor is configured to: identify a plurality of measurement objects (MOs) configured to measure downlink performance of a second communication network while being connected to a first base station (BS) of a first network, identify measurement priorities of the plurality of MOs configured at least based on information related to transmission and reception performance of signals having frequencies corresponding to a plurality of MOs stored in the memory, measure received signal intensities of at least one MO from signals transmitted from a second BS of the second communication network based on the measurement priorities of the plurality of MOs, and control the electronic device to transmit at least one measurement report (MR) to the first BS of the first communication network based on a measurement result of the received signal intensities for the at least one MO.

According to various example embodiments, a method of reporting measurement for frequency selection by an electronic device includes: identifying a plurality of measurement objects (MOs) configured to measure downlink performance of a second communication network while being connected to a first base station (BS) of a first communication network, identifying measurement priorities of the plurality of MOs configured at least based on information related to transmission and reception performance of signals having frequencies corresponding to a plurality of MOs stored in a memory, measuring received signal intensities of at least one MO from signals transmitted from a second BS of the second communication network, based on the measurement priorities of the plurality of MOs, and transmitting at least one measurement report (MR) to the first BS of the first communication network, based on a measurement result of the received signal intensities for the at least one MO.

According to various example embodiments, when carrier aggregation (CA) is supported in a 5G network (for example, a communication network supporting an mmWave band), a CC having relatively better performance may be configured as an SpCell by configuring measurement priorities of MOs and/or reporting priorities of MRs on the basis of transmission and reception performance of the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
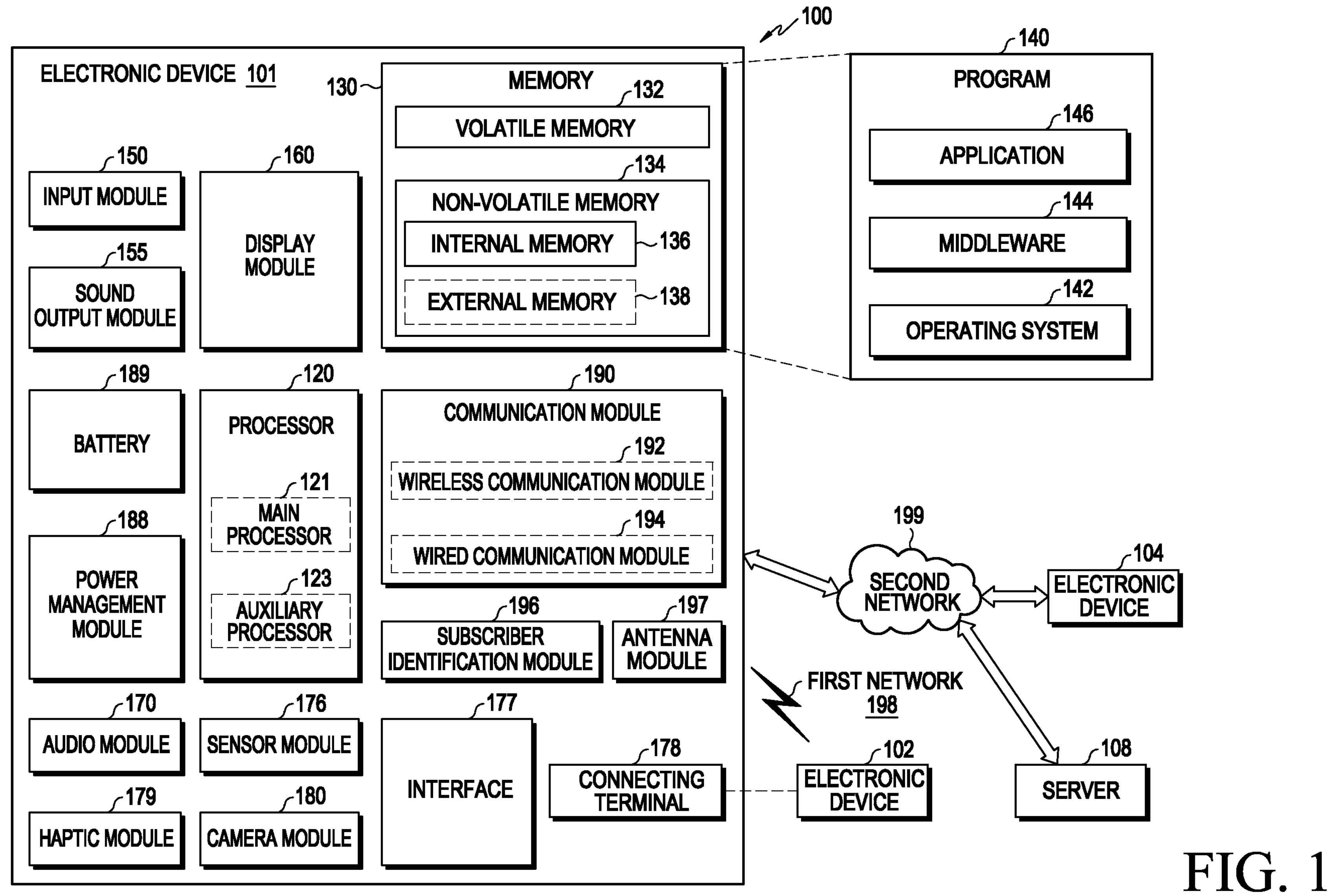
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
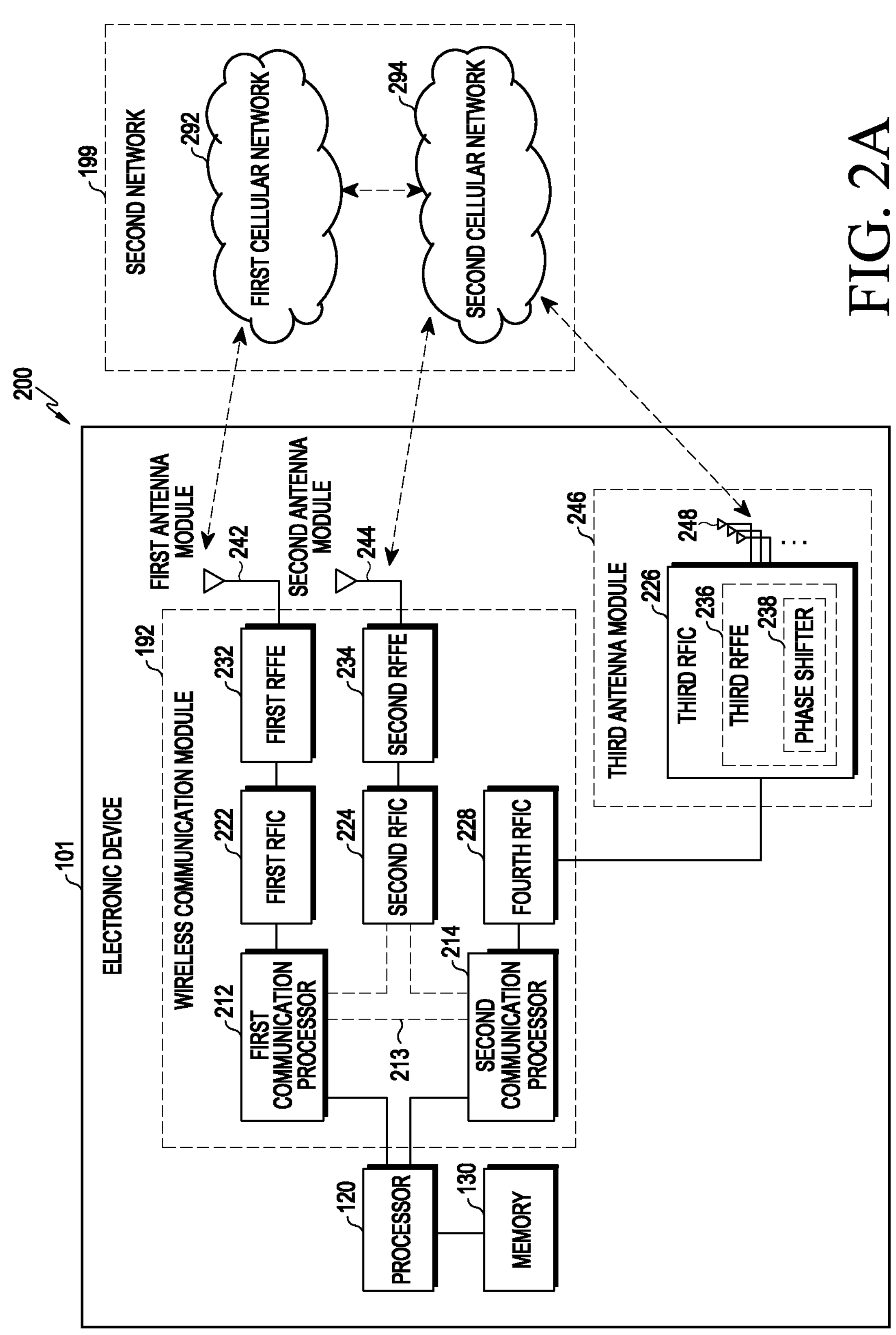
FIG. 2A is a block diagram illustrating an example configuration of an electronic device for supporting legacy network communication and 5G network communication according to various embodiments.

FIG. 2A is a block diagram 200 illustrating an example configuration of the electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include the processor (e.g., including processing circuitry) 120 and the memory 130. A second network 199 may include a first cellular network 292 and a second cellular network 294. According to an embodiment, the electronic device 101 may further include at least one of the elements illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a portion of the wireless communication module 192. According to an embodiment, the fourth RFIC 228 may be omitted or may be included as a part of the third RFIC 226.

The first communication processor 212 may include various processing circuitry and support establishment of a communication channel in a band to be used for wireless communication with the first cellular network 292 and legacy network communication through the established communication channel According to various embodiments, the first cellular network may be a legacy network including a second generation (2G), 3G, 4G, or long term evolution (LTE) network. The second communication processor 214 may include various processing circuitry and support establishment of a communication channel corresponding to a predetermined band (for example, about 6 GHz to about 60 GHz) among bands to be used for wireless communication with the second network 294 and 5G network communication through the established communication channel. According to various embodiments, the second cellular network 294 may be a 5G network defined in the 3GPP. In addition, according to an embodiment, the first communication processor 212 or the second communication processor 214 may support establishment of a communication channel corresponding to another predetermined band (for example, equal to or lower than about 6 GHz) among bands to be used for wireless communication with the second network 294 and 5G network communication through the established communication channel.

The first communication processor 212 may transmit and receive data to and from the second communication processor 214. For example, data classified to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an interface 213 between processors. The inter-processor interface 213 may be implemented as, for example, a universal asynchronous receiver/transmitter (UART) (for example, a high speed-UART (HS-UART) or a peripheral component interconnect bus express (PCIe) interface), but there is no limitation therein. Alternatively, the first communication processor 212 and the second communication processor 214 may exchange control information and packet data information through, for example, a shared memory. The first communication processor 212 may transmit and receive various pieces of information such as sensing information, information on an output intensity, and resource block (RB) allocation information to and from the second communication processor 214.

According to implementation, the first communication processor 212 may not be directly connected to the second communication processor 214. In this case, the first communication processor 212 may transmit and receive data to and from the second communication processor 214 through the processor 120 (for example, an application processor). For example, the first communication processor 212 and the second communication processor 214 may transmit and receive data to and from the processor 120 (for example, an application processor) through an HS-UART interface or a PCIe interface, but there is no limitation on the type thereof. Alternatively, the first communication processor 212 and the second communication processor 214 may exchange control information and packet data information with the processor 120 (for example, an application processor) through a shared memory.

Figure 2B:
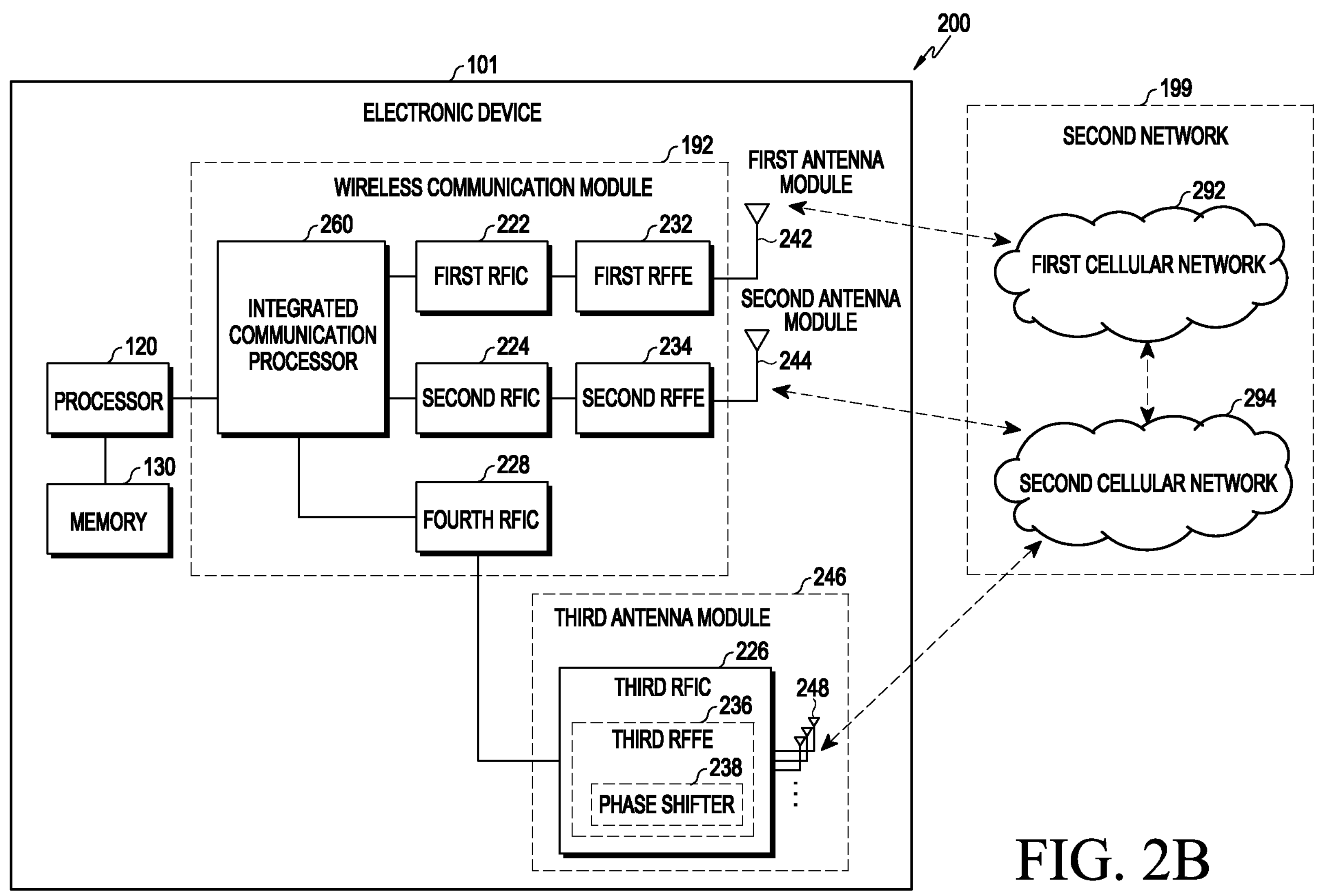
FIG. 2B is a block diagram illustrating an example configuration of the electronic device for supporting legacy network communication and 5G network communication according to various embodiments.

According to an embodiment, the first communication processor 212 and the second communication processor 214 may be implemented within a single chip or a single package. According to various embodiments, the first communication processor 212 or the second communication processor 214 may be configured with the processor 120, the auxiliary processor 123, or the communication module 190 within a single chip or a single package. For example, as illustrated in FIG. 2B, an integrated communication processor 260 may include various processing circuitry and support all functions for communication with the first cellular network 292 and the second cellular network 294.

In transmission, the first RFIC 222 may convert a baseband signal generated by the first communication processor 212 into a radio frequency (RF) signal of about 700 MHz to about 3 GHz used for the first network 292 (for example, legacy network). In reception, the RF signal may be acquired from the first network 292 (for example, legacy network) through an antenna (for example, the first antenna module 242) and may be preprocessed through the RFFE (for example, first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, referred to as a 5G Sub6 RF signal) in a Sub6 band (for example, equal to or lower than about 6 GHz) used in the second network 294 (for example, 5G network). In reception, a 5G Sub6 RF signal may be acquired from the second cellular network 294 (for example, 5G network) through an antenna (for example, the second antenna module 244) and may be preprocessed through the RFFE (for example, second RFFE 234). The second RFIC 224 may convert the preprocessed 5G Sub6 RF signal into a baseband signal to be processed by the corresponding communication processor among the first communication processor 212 or the second communication processor 214.

The third RFIC 226 may convert a baseband signal generated by the second communication processor 214 into an RF signal (hereinafter, referred to as a 5G Above6 RF signal) in a 5G Above6 band (for example, from about 6 GHz to about 60 GHz) used by the second network 294 (for example, 5G network). In reception, a 5G Above6 RF signal may be acquired from the second network 294 (for example, 5G network) through an antenna (for example, the antenna 248) and may be preprocessed through the third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

The electronic device 101 may include the fourth RFIC 228 separately from the third RFIC 226 or as a part thereof according to an embodiment. In this case, after converting a baseband signal generated by the second communication processor 214 into an RF signal (hereinafter, referred to as an IF signal) in an intermediate frequency band (for example, about 9 GHz to about 11 GHz), the fourth RFIC 228 may transmit the IF signal to the third RFIC 226. The third RFIC 226 may convert the IF signal into a 5G Above6 RF signal. In reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a portion of a single chip or a single package. According to various embodiments, when the first RFIC 222 and the second RFIC 224 are implemented as a single chip or a single package in FIG. 2A or FIG. 2B, they may be implemented as an integrated RFIC. In this case, the integrated RFIC may be connected to the first RFFE 232 and the second RFFE 234, and the integrated RFIC may convert a baseband signal into a signal in a band supported by the first RFFE 232 and/or the second RFFE 234 and transmit the converted signal to one of the first RFFE 232 and the second RFFE, 234. According to an embodiment, the first RFFE 232 and the second RFFE 234 may be implemented as at least a portion of a single chip or a single package. According to an embodiment, at least one antenna module of the first antenna module 242 or the second antenna module 244 may be omitted or may be combined with another antenna module to process RF signals in a plurality of corresponding bands.

According to an embodiment, the third RFIC 226 and the antenna 248 may be disposed on the same substrate to configure the third antenna module 246. For example, the wireless communication module 192 or the processor 120 may be disposed on a first substrate (for example, main PCB). In this case, the third RFIC 226 may be disposed in a partial area (for example, bottom side) of a second substrate (for example, sub PCB) separated from the first substrate and the antennas 248 may be disposed in another partial area (for example, top side) to configure the third antenna module 246. By disposing the third RFIC 226 and the antennas 248 on the same substrate, it is possible to reduce the length of a transmission line therebetween. This is to reduce loss (for example, attenuation) of the signal in a high frequency band (for example, about 6 GHz to about 60 GHz) used for, for example, 5G network communication due to the transmission line. Accordingly, the electronic device 101 may improve the quality or speed of communication with the second network 294 (for example, the 5G network).

According to an embodiment, the antennas 248 may be configured as an antenna array including a plurality of antenna elements which can be used for beamforming. In this case, the third RFIC 226 may include, for example, a plurality of phase shifters 238 corresponding to the plurality of antenna elements as a part of the third RFFE 236. In transmission, each of the plurality of phase shifters 238 may convert a phase of a 5G Above6 RF signal to be transmitted to the outside of the electronic device 101 (for example, a base station of the 5G network) through a corresponding antenna element. In reception, each of the plurality of phase shifters 238 may convert the phase of the 5G Above6 RF signal received from the outside through the corresponding antenna element into the same phase or substantially the same phase. This enables transmission or reception through beamforming between the electronic device 101 and the outside.

The second cellular network 294 (for example, 5G network) may operate independently from the first cellular network 292 (for example, legacy network) (for example, standalone (SA)) or operate through a connection to thereto (for example, non-standalone (NSA)). For example, in the 5G network, only an access network (for example, a 5G radio access network (RAN) or a next generation RAN (NG RAN)) may exist without a core network (for example, a next generation core (NGC)). In this case, the electronic device 101 may access the access network of the 5G network and then access an external network (for example, Internet) under the control of the core network (for example, evolved packed core (EPC) of the legacy network. Protocol information (for example, LTE protocol information) for communication with the legacy network and protocol information (for example, new radio (NR) protocol information) for communication with the 5G network may be stored in the memory 230 and may be accessed by another element (for example, the processor 120, the first communication processor 212, or the second communication processor 214).

Figure 3A:
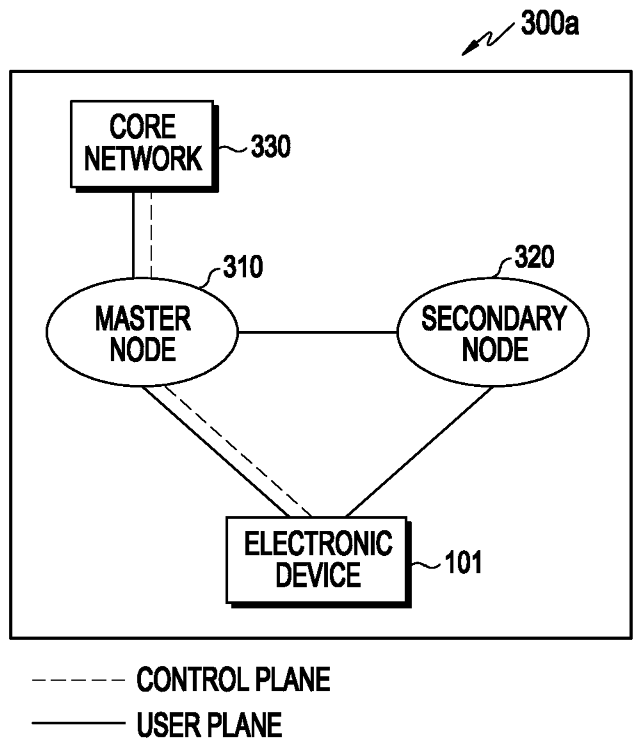
FIG. 3A is a diagram illustrating wireless communication systems providing a network of legacy communication and/or 5G communication according to various embodiments.
Figure 3B:
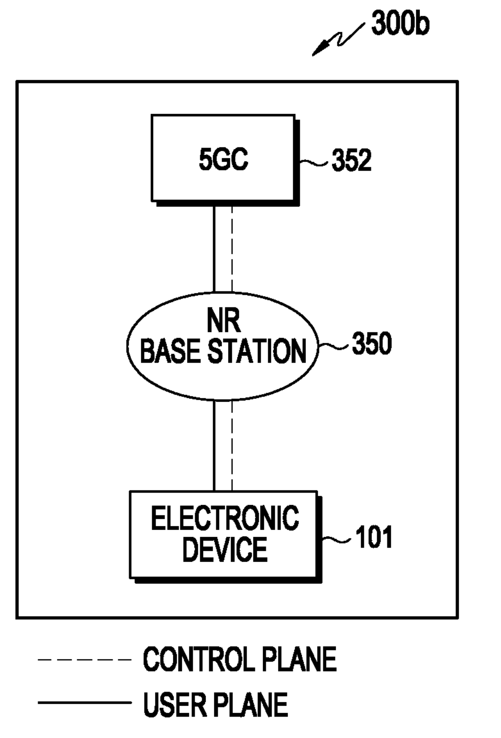
FIG. 3B is a diagram illustrating wireless communication systems providing a network of legacy communication and/or 5G communication according to various embodiments.
Figure 3C:
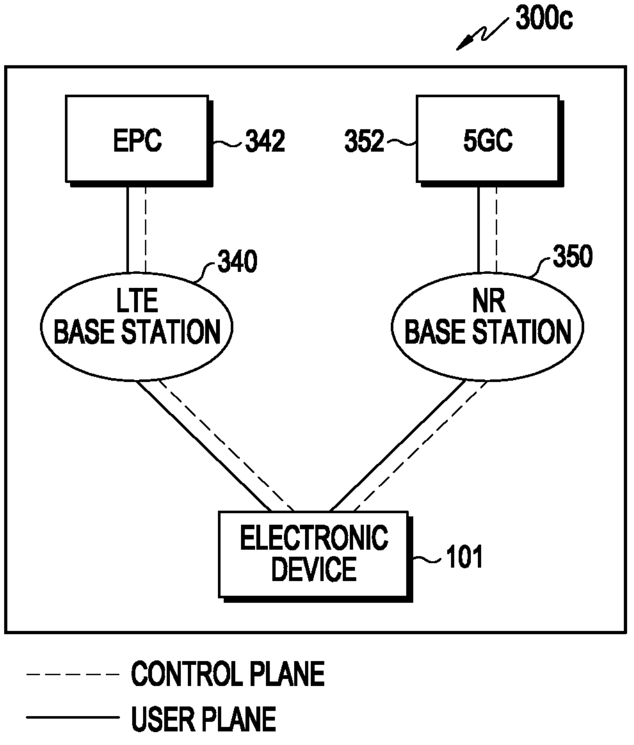
FIG. 3C is a diagram illustrating wireless communication systems providing a network of legacy communication and/or 5G communication according to various embodiments.

FIGS. 3A, 3B, and 3C are diagrams illustrating wireless communication systems that provide the network of legacy communication and/or 5G communication according to various embodiments. Referring to FIGS. 3A, 3B, and 3C, network environments 300*a*, 300*b*, and 330*c* may include at least one of a legacy network and a 5G network. The legacy network may include, for example, a 4G or LTE eNB 340 (for example, an eNodeB (eNB)) of the 3GPP standard supporting radio access with the electronic device 101 and an evolved packet core (EPC) 342 for managing 4G communication. The 5G network may include, for example, a New Radio (NR) base station 350 (for example, a gNodeB (gNB)) supporting radio access with the electronic device 101 and a 5$^{th}$ generation core (5GC) 352 for managing 5G communication of the electronic device 101.

According to various embodiments, the electronic device 101 may transmit and receive a control message and user data through legacy communication and/or 5G communication. The control message may include, for example, a message related to at least one of security control of the electronic device 101, bearer setup, authentication, registration, or mobility management. The user data may be, for example, user data other than a control message transmitted and received between the electronic device 101 and a core network 330 (for example, the EPC 342).

Referring to FIG. 3A, the electronic device 101 according to an embodiment may transmit and receive at least one of a control message or user data to and from at least some of the 5G network (for example, the NR gNB 350 and the 5GC 352) using at least some of the legacy network (for example, the LTE eNB 340 and the EPC 342).

According to various embodiments, the network environment 300*a* may include a network environment for providing wireless communication dual connectivity (DC) to the LTE eNB 340 and the NR gNB 350 and transmitting and receiving a control message to and from the electronic device 101 through one core network 230 of the EPC 342 or the 5GC 352.

According to various embodiments, in the DC environment, one of the LTE eNB 340 or the NR gNB 350 may operate as a master node (MN) 310, and the other may operate as a secondary node (SN) 320. The MN 310 may be connected to the core network 230 and transmit and receive a control message. The MN 310 and the SN 320 may be connected through a network interface and may transmit and receive a message related to management of radio resources (for example, communication channels) to and from each other.

According to various embodiments, the MN 310 may include the LTE eNB 340, the SN 320 may include the NR gNB 350, and the core network 330 may include the EPC 342. For example, the control message may be transmitted and received through the LTE gNB 340 and the EPC 342, and the user data may be transmitted and received through at least one of the LTE eNB 340 or the NR gNB 350.

According to various embodiments, the MN 310 may include the NR gNB 350, the SN 320 may include the LTE eNB 340, and the core network 330 may include the 5GC 352. For example, the control message may be transmitted and received through the NR gNB 350 and the 5GC 352, and the user data may be transmitted and received through at least one of the LTE eNB 340 or the NR gNB 350.

Referring to FIG. 3B, according to various embodiments, the 5G network may include the NR gNB 350 and the 5GC 352 and may independently transmit and receive the control message and the user data to and from the electronic device 101.

Referring to FIG. 3C, the legacy network and the 5G network according to various embodiments may independently transmit and receive data. For example, the electronic device 101 and the EPC 342 may transmit and receive a control message and user data through the LTE eNB 340. According to an embodiment, the electronic device 101 and the 5GC 352 may transmit and receive a control message and user data through the NR gNB 350.

According to various embodiments, the electronic device 101 may be registered in at least one of the EPC 342 or the 5GC 352 and transmit and receive a control message.

According to various embodiments, the EPC 342 or the 5GC 352 may interwork and manage communication of the electronic device 101. For example, movement information of the electronic device 101 may be transmitted and received through an interface between the EPC 342 and the 5GC 352.

As described above, the dual connection through the LTE eNB 340 and the NR gNB 350 may be also named E-UTRA new radio dual connectivity (EN-DC).

In the following description, various embodiments in which the electronic device connected to the LTE communication network on the basis of the EN-DC selects a specific SpCell of the Nr communication network on the basis of a configured measurement object (MO) are described. The following embodiments are described on the basis of the EN-DC as an example, but may be equally or similarly applied to multi-radio (MR)-DC in various types including the EN-DC.

Figure 4A:
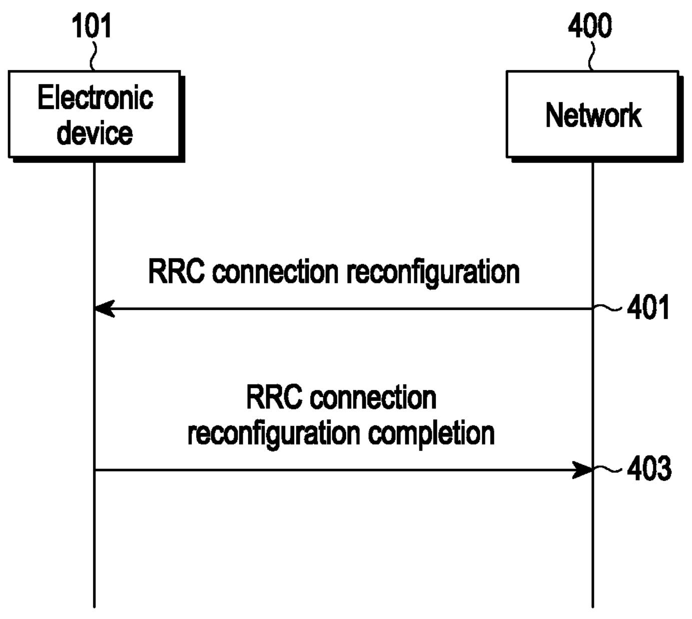
FIG. 4A is a signal flow diagram illustrating example operations of the electronic device and the network according to various embodiments.

FIG. 4A is a signal flow diagram illustrating example operations of the electronic device and the network according to various embodiments.

According to various embodiments, in operation 401, the electronic device 101 (for example, at least one of the processor 120, the first communication processor 212, the second communication processor 214, the integrated communication processor 260, or an integrated SoC (not shown)) may receive an RRC connection reconfiguration (or RRC reconfiguration) message from a network 400. The electronic device 101 may reconfigure the configuration of the RRC connection on the basis of the RRC connection reconfiguration message. In this disclosure, the RRC connection reconfiguration message may include one of an RRC connection reconfiguration message or an RRC reconfiguration message. The electronic device 101 may make, for example, an RRC connection with the network 400, and thereafter may receive the RRC connection reconfiguration message. In operation 403, the electronic device 101 may transmit an RRC connection reconfiguration complete (or RRC reconfiguration complete) message indicating completion of the reconfiguration to the network 400. The network 400 may be a BS (for example, at least one of eNB, gNB, ng-eNB, or en-gNB) corresponding to communication for configuring, for example, an RRC connection reconfiguration message, but when some of the functions of the BS are virtualized, may be implemented as at least a portion of hardware for the radio control and a server for performing a virtualized function. The network 400 may also be named a serving cell.

According to various embodiments, a process of the RRC connection reconfiguration may be for configuring the RRC connection reconfiguration (for example, configuring, controlling, and/or releasing a resource block (RB)), performing the reconfiguration along with synchronization, setting, controlling, and/or releasing measurement, and adding, controlling, and/or releasing an SCell and a cell group. As a portion of the process of reconfiguring the RRC connection, NAS dedicated information may be transmitted to the electronic device 101 from the network 400. When the electronic device 101 is in, for example, an RRC-connected state (RRC_CONNECTED state), the network 400 may perform an RRC connection reconfiguration procedure. For example, when a measurement configuration (for example, 3GPP TS 38.331 or measConfig) of 36.331) is included in the RRC connection reconfiguration message, the electronic device 101 may perform a measurement configuration procedure (for example, measurement configuration procedure configured in 3GPP TS 38.331 or 36.331).

As described above, the network 400 according to various embodiments may configure the electronic device 101 in the RRC-connected state to perform measurement and report according to a measurement configuration. The measurement configuration may be provided through UE-dedicated RRC signaling, for example, the RRC connection reconfiguration message. For example, when the electronic device 101 performs 3GPP LTE communication with the network 400 or communication for controlling dual connectivity is configured as 3GPP LTE communication, the electronic device 101 may receive a request for performing measurement in the following types.

Intra-frequency measurements: measurement in downlink carrier frequency(s) of serving cell(s)

Inter-frequency measurements: measurement in frequencies different from any frequency among downlink carrier frequency(s) of serving cell(s)

Measurement in frequency in inter-RAT (for example, NR, URTA, GERAN, CDMA 2000 HRPD, or CDMA 2000 I×RTT)

For example, when the electronic device 101 performs 5G communication with the network 400 or communication for controlling dual connectivity is configured as 5G communication, measurement in the following types may be performed.

NR measurement, for example, intra-frequency measurement in NR and/or inter-frequency measurement in NR Inter-RAT measurement of E-UTRA frequency In the measurement configuration, information on a measurement object (MO) may be included. The measurement object may include, for example, subcarrier spacing (SCS) of a reference signal to be measured and a frequency/time location. The electronic device 101 may identify a frequency for measurement on the basis of the measurement object within the measurement configuration. The measurement object may include a measurement object identity that is information indicating a frequency to be measured (for example, ARFCN-ValueEUTRA and/or ARFCN-ValueNR) or a cell black list and/or a cell white list.

According to various embodiments, the measurement configuration of the RRC connection reconfiguration message may include a reporting configuration. For example, the reporting configuration may include at least one of a reporting criterion, a reporting format, or an RS type but there is no limitation. The reporting criterion is a condition for triggering a UE to transmit a measurement report and may be periodic or single event description. For example, in the case of LTE communication, the reporting format may be information on the number of reports which the UE includes in the measurement report and relevant information (for example, the number of cells to be reported) in LTE communication. For example, in the case of 5G communication, the reporting format may be information on the number per cell and per beam to be included in the measurement report and other relevant information (for example, the maximum number of beams per cell to be reported and the maximum number of cells). The RS type may indicate, for example, a beam to be used by the UE and an RS of the measurement result.

According to various embodiments, the measurement configuration of the RRC connection reconfiguration message may include at least one of a measurement identity, a quantity configuration, or a measurement gap. The measurement identity may be a list of measurement identities related to the measurement object. The quantity configuration may define a periodic report of measurement filtering configuration and measurement used for all event evaluations and relevant reports. The measurement gap is a period on which the UE performs measurement and may be, for example, an interval in which uplink or downlink transmission is not scheduled.

Figure 4B:
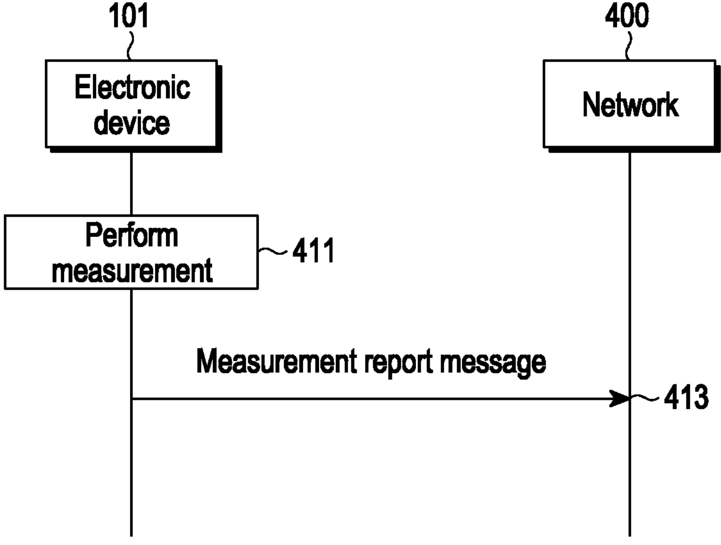
FIG. 4B is a signal flow diagram illustrating an example operation of the electronic device according to various embodiments.

FIG. 4B is a signal flow diagram illustrating an example operation of the electronic device according to various embodiments.

According to various embodiments, in operation 411, the electronic device 101 in the RRC-connected state may perform measurement for the measurement object. For example, the electronic device 101 may measure at least one of reference signal received power (RSRP), reference signal received quality (RSRQ), reference signal strength indicator (RSSI), or signal to interference-plus-noise ratio (SINR) corresponding to at least one of an inter-frequency, an intra-frequency, or an inter-RAT on the basis of the measurement configuration corresponding to each serving cell. In the disclosure, measurement of a communication system by the electronic device 101 may be performance of measurement of at least one of RSRP, RSRQ, RSSI, or SINR at a reference point by the communication signal from the outside.

In various embodiments, measurement of a communication system by the electronic device 101 may be identification of an RSRP measurement value by at least one of the processor 120, the first communication processor 212, the second communication processor 214, the integrated communication processor 260, or an integrated SoC (not shown), but there is no limitation. For example, the electronic device 101 may identify, as the RSRP measurement value, a linear average of power distribution (in units of watts [W]) of a resource element carrying at least one of a reference signal or a synchronization signal within a frequency bandwidth to be measured. Meanwhile, any signal defined in the 3GPP can be the reference signal and the synchronization signal. For example, the electronic device 101 may identify the RSRP measurement value on the basis of the linear average of the power distribution at a reference point. For example, in LTE communication, the electronic device 101 may identify the RSRP measurement value on the basis of the linear average of power distribution at an antenna connector of an antenna (for example, the first antenna module 242) for receiving the corresponding communication signal. For example, in FR1 of NR, the electronic device 101 may identify the RSRP measurement value on the basis of the linear average of power distribution at an antenna connector of an antenna (for example, the first antenna module 244) for receiving the corresponding communication signal. For example, in FR2 of NR, the electronic device 101 may identify a measurement value (for example, synchronization signal-reference signal received power (SS-RSRP) on the basis of a combined signal from an antenna element (for example, at least one antenna element of the antenna 248) corresponding to a given receiver branch.

Although not illustrated, the electronic device 101 may include at least one sensor (for example, at least one of a voltage sensor, a current sensor, or a power sensor) capable of measuring power at a reference point (for example, antenna connector) and may measure power at the reference point on the basis of sensing data from at least one sensor. As described above, there is no limitation on the reference point, and thus there is no limitation on a location to which at least one sensor is connected.

In various embodiments of the disclosure, the performance of the RSRQ measurement by the electronic device 101 may refer, for example, to at least one of the processor 120, the first communication processor 212, the second communication processor 214, the integrated communication processor 260, or an integrated SoC (not shown) identifying the RSRQ measurement value, but there is no limitation. For example, the electronic device 101 may perform measurement of the RSRQ on the basis of [Equation 1] below.

RSRQ=NsRSRP|RSSI [Equation 1]

An RSSI is an RSSI of a carrier, and may be, for example, a linear average of received total power observed in a specific OFDM symbol of a measurement subframe in a measurement bandwidth for N resource blocks and may include adjacent channel interference and thermal noise. N may be the number of resource blocks. The electronic device 101 may measure the RSSI and the RSRP and identify the RSRQ therefrom. Alternatively, the electronic device 101 may measure the SINR on the basis of power of a signal of a serving cell compared to noise based on an RS of the serving cell and PDSCH power.

Through the operation, the electronic device 101 may identify the measurement result from, for example, a physical layer, and may determine whether the reporting criterion is satisfied on the basis of the measurement result. The electronic device 101 may perform filtering (for example, layer 3 filtering) on the performance result and determine whether the reporting criterion is satisfied on the basis of the filtering result. [Equation 2] below shows a layer 3 filtering process.

$$F_n = (1 - a)SF_{n-1} + aSM_n \quad \text{[Equation 2]}$$

$M_n$ may be a measurement result (for example, RSRP and/or RSRQ) most recently received from a physical layer. $F_n$ is an updated filtered measurement result and may be used for evaluating a measurement report or a reporting criterion. $F_{n-1}$ may be the existing filtered measurement result. When a first measurement result is received from the physical layer, $F_0$ may be configured as $M_1$. a may be $½^{(ki/4)}$, ki may be a filtering coefficient corresponding to a measurement quantity of an $i^{th}$ quantity configuration in a quantity configuration list, and i may be a quantity configuration index of a measurement object. In various embodiments of the disclosure, the "measurement result" may refer to at least one of, for example, a value acquired form a physical layer or a filter value of the value acquired from the physical layer.

According to various embodiments, the electronic device 101 may determine whether the measurement result satisfies a reporting criterion. The reporting criterion may include various example events described below, but there is no limitation.

Event A1: Serving becomes better than threshold

Event A2: Serving becomes worse than threshold

Event A3: Neighbour becomes offset better than PCell/PSCell (or SpCell of NR)

Event A4: Neighbour becomes worse than threshold

Event A5: PCell/PSCell (or SpCell of NR) becomes worse than threshold1 and neighbor (or neighbour/SCell of NR) becomes better than threshold2

Event A6: Neighbour becomes offset better than SCell (or SCell of NR)

Event B1: Inter RAT neighbour becomes better than threshold

Event B2: PCell becomes worse than threshold1 and inter RAT neighbour becomes better than threshold2

The above-described reporting criteria may follow, for example, 3GPP TS 36.331 or 3GPP TS 38.331 but there is no limitation on the type thereof.

According to various embodiments, the electronic device 101 does not perform measurement which should be performed by the measurement configuration all the time, but may perform the measurement according to the measurement period.

According to various embodiments, the electronic device 101 may transmit a measurement report message to the network 400 (for example, a serving cell) on the basis of satisfaction of the reporting criterion in operation 413. For example, when the satisfied reporting criterion among the above-described reporting criteria is maintained during an operation of a timer corresponding to a time-to-trigger value (for example, before the time expires), the electronic device 101 may transmit the measurement report message to the network 400. The electronic device 101 may configure the measurement result within the measurement report message (for example, measResults of 3GPP TS 38.331 or 3GPP TS 36.331) for a measurement identity for which the measurement report procedure is triggered. An information element (IE) of the measurement result (for example, at least one of RSRP, RSRQ, or SINR) may include the result measured for intra-frequency, inter-frequency, and an inter-RAT mobility. For example, the measurement report message may include a measurement identity and a measurement result.

Figure 5:
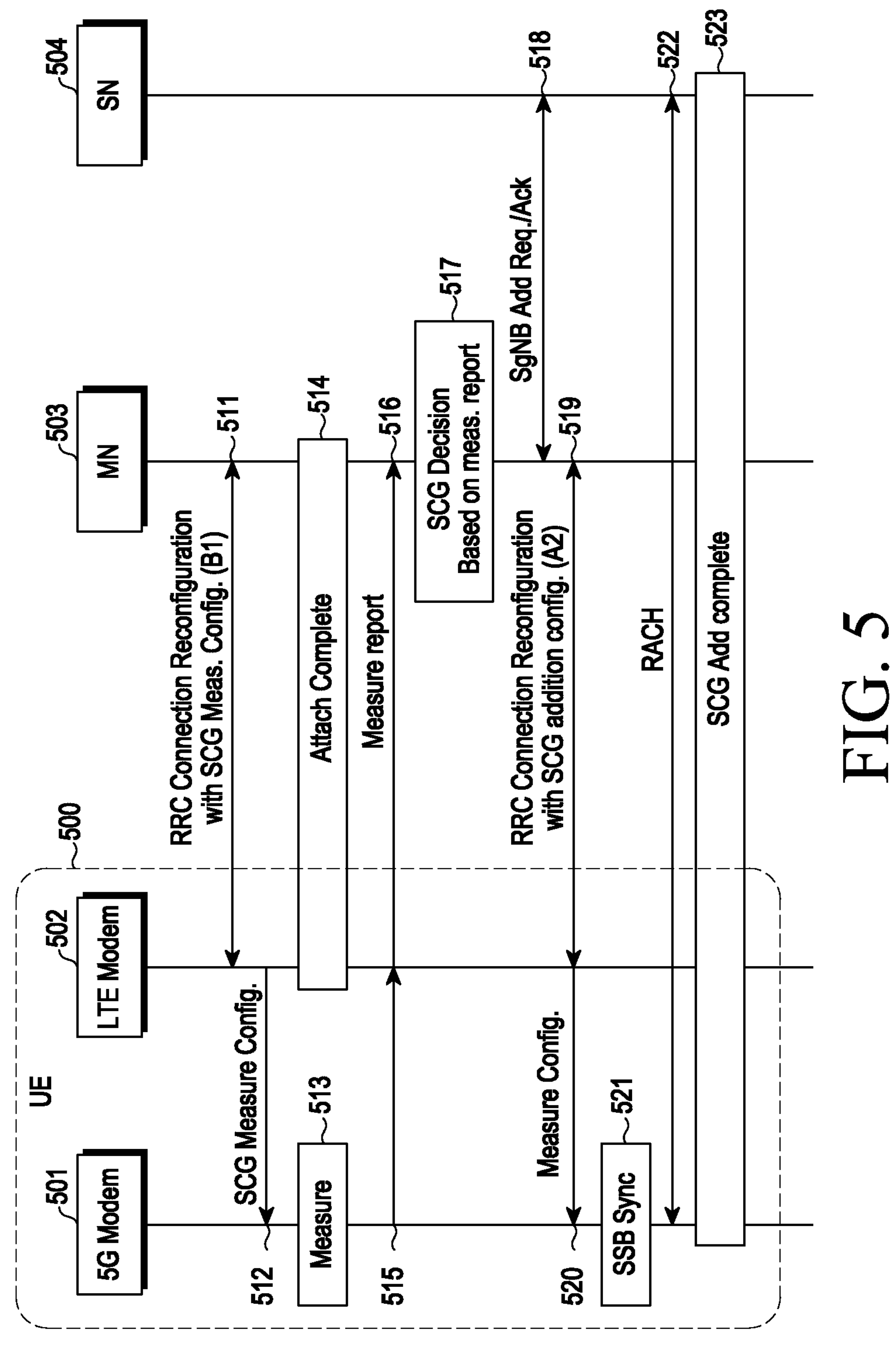
FIG. 5 is a signal flow diagram illustrating an example method of operating a user terminal, an MN, and an SN according to various embodiments.

FIG. 5 is a signal flow diagram illustrating an example method of operating a user terminal, an MN, and an SN according to various embodiments. According to various embodiments, a UE 500 (for example, the electronic device 101) may include a modem 501 (for example, the second communication processor 214 of FIG. 2A) and an LTE modem 502 (for example, the first communication processor 212 of FIG. 2A). Although the 5G modem 501 and the LTE modem 502 are expressed as separate blocks in FIG. 5, the 5G modem 501 and the LTE modem 502 may be implemented in the form of separate processors (for example, chips) such as the second communication processor 214 and the first communication processor 212 as illustrated in FIG. 2A, or may be implemented in the form of one processor such as the integrated communication processor 260 as illustrated in FIG. 2B. In FIG. 5, separate blocks are illustrated for convenience of description, but the separation is not limited to physical separation. The LTE modem 502 may perform RRC connection reconfiguration to configure a secondary cell group (SCG) measurement information (SCG Meas.) reporting criterion as event B1 with an MN 503 (for example, master node 310 of FIG. 3A) in operation 511. Event B1 may indicate an event that measurement information corresponding to a neighboring node in different type (inter RAT neighbor) is larger than a threshold value (for example, reference signal received power (RSRP) of −120 dBm). In operation 512, the LTE modem 501 may configure the SCG measurement report condition (SCG measure config.). The 5G modem 501 may measure a plurality of measurement objects (MOs) in operation 513. The LTE modem 502 may complete attach with the MN 503 in operation 514. When it is identified that the event B1 is satisfied (for example, when reference signal received power (RSRP) of a received signal for a frequency corresponding to a specific MO is larger than −120 dBm), the 5G modem 501 and the LTE modem 502 may transfer a measurement report (MR) to the MN 503 in operation 515 and operation 516. For example, the electronic device 101 may transmit cell identification information (or node identification information) for the measurement that is larger than a threshold value to the MN 503.

The MN 503 may determine an SCG on the basis of a measurement quantity report (meas. Report) in operation 517. For example, the MN 503 may select an SN 504 (for example, the secondary node 320 of FIG. 3A). The MN 503 may make a request for adding an SgNB to the SN 504 and receive ack thereof in operation 518. The MF 503 may perform RRC connection reconfiguration with SCG including a reporting criterion of an event A2 with the UE 500 in operation 519. The 5G modem 501 may configure a report condition in operation 520. In operation 521, the 5G modem 501 may perform SSB synchronization. The UE 500 may perform RACH (for example, contention free (CF) RACH or contention-based RACH) with the SN 504 in operation 522. In operation 523, the UE 500 may complete SCG addition with the MN 503 and the SN 504.

Figure 6:
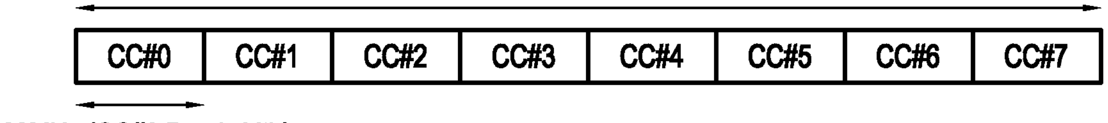
FIG. 6 is a diagram illustrating a plurality of CCs supporting CA according to various embodiments.

FIG. 6 is a diagram illustrating a plurality of CCs supporting CA according to various embodiments. According to various embodiments, a 5G wireless communication system operating a wide frequency band may provide a higher data transmission rate by transmitting data through a plurality of component carriers (CCs) using a carrier aggregation (CA) scheme.

Referring to [Table 1] below, each communication operator may receive and use a bandwidth, for example, 800 MHz for a 5G wireless communication service.

TABLE 1

| Operator | Bandwidth (Hz) | Allocated frequency location |
|---|---|---|
| Operator A | 800M | 28.1~28.9 GHz |
| Operator B | 800M | 26.5~27.3 GHz |
| Operator C | 800M | 27.3~28.1 GHz |

Each operator may divide entire frequency band of 800 MHz in units of 100 MHz through the CA technology and operate the frequency band of 100 MHz as one CC. For example, the electronic device 101 may apply the CA technology supporting 8 CCs (CC #1 to CC #7).

Referring to FIG. 6, the communication operator may separate the entire bandwidth of 800 MHz into 8 bandwidths of 100 MHz and provide the service. For example, each electronic device (for example, the electronic device 101 of FIG. 1) may receive distribution of one or a plurality of frequency bandwidths among the 8 bandwidths of 100 MHz and transmit and receive data. The BS may aggregate the plurality of bandwidths of 100 MHz and serve one electronic device, thereby providing a high data transmission rate. Each CC may be referred to as a cell, and one CC may be referred to as a primary CC (PCell or SpCell) and the other CCs may be referred to as secondary CCs (SCells). The BS may activate and operate a larger number of CCs for the electronic device requiring a higher data transmission rate, and thus may effectively distribute load to a plurality of electronic devices within the BS coverage.

Figure 7:
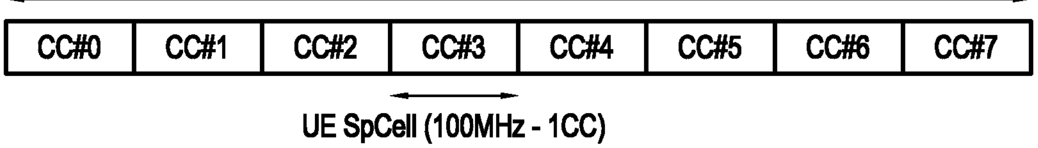
FIG. 7 is a diagram illustrating an SpCell among a plurality of CCs supporting CA according to various embodiments.

FIG. 7 is a diagram illustrating an SpCell among a plurality of CCs supporting CA according to various embodiments. Referring to FIG. 7, each electronic device 101 may operate with 8 CCs (downloink-8CC) in the downlink and two CCs (uplink-2CC (2×2 MIMO)) or four CCs (uplink-4CC (1×1 SISO)) in the uplink according to a capability. According to various embodiments, as illustrated in FIG. 7, a total of 8 CCs may be used to transmit downlink data, and some CCs (for example, CC #3 and CC #4) may be used to transmit uplink data. According to various embodiments, the electronic device 101 or the communication network may configure one specific CC (for example, CC #3) among uplink CCs as the SpCell (special cell) and transmit not only user data but also control data through the corresponding CC. In this case, among all CCs, a CC configured as the uplink CC of the electronic device 101 or the SpCell may influence link quality between the BS and the electronic device 101.

According to various embodiments, the electronic device 101 may operate with EN-DC as illustrated in FIG. 5. For example, after the electronic device 101 is connected to a specific LTE cell, the BS of the corresponding LTE cell may ask the electronic device 101 whether a 5G signal can be measured, and the electronic device 101 may transmit the corresponding information to the BS of the LTE cell through a UE capability message. The BS of the LTE cell may transmit a measurement object (MO) related to 5G signal measurement and a configuration for a measurement report (MR) to the electronic device 101. The MO may indicate a measurement frequency band for which a request is made to the electronic device 101, and the configuration for the MR may indicate a condition for determining whether a report is transmitted to the BS after measurement of the MO. [Table 2] below shows the MO which the BS of the LTE cell transmits to the electronic device 101 and the configuration for the MR.

TABLE 2

| MeasObjectID (NR) | CarrierFreq(ARFCN) | Report Config |
|---|---|---|
| 17 | 2071667 | Event B1 |
| 18 | 2074999 | Event B1 |
| 21 | 2076665 | Event B1 |
| 22 | 2078331 | Event B1 |
| 24 | 2072081 | Event B1 |

Referring to [Table 2] above, the BS of the LTE cell may transmit a plurality of MOs corresponding to a plurality of CCs which can operate to the electronic device 101, and the electronic device 101 may measure reception signals for the corresponding MOs and then transmit the MR as the result thereof. A condition for transmitting the MR may be included in the event B1 of [Table 2] above. For example, when the received signal intensity (for example, RSRP) of the specific MO measured by the electronic device 101 is higher than or equal to a specific value (for example, −120 dBm), the MR may be transmitted to the BS of the LTE cell. According to various embodiments, the electronic device 101 may inform the BS of the LTE cell of MOs of which the signal intensity is higher than or equal to the configured signal intensity, and the BS of the LTE cell may determine whether the electronic device 101 accesses the 5G communication network on the basis of the received MR.

According to various embodiments, the electronic device 101 may determine priorities of received signal intensity for a plurality of MOs and reporting priorities of the MRs on the basis of the following embodiments. According to various embodiments, the measurement orders of the MOs and/or the reporting orders of the MRs may influence the determination of the SpCell by the BS.

Figure 8:
FIG. 8 is a diagram illustrating selection of a SpCell from among a plurality of CCs supporting CA according to various embodiments.

FIG. 8 is a diagram illustrating example selection of a SpCell from among a plurality of CCs supporting CA according to various embodiments. According to various embodiments, when the BS cannot know in advance time points at which MRs for a plurality of MOs provided to the electronic device 101 are received and orders thereof, the BS may configure a CC corresponding to the MO first transmitting the MR to the electronic device 101 as the SpCell. For example, as illustrated in FIG. 8, the BS may transmit MO #0 corresponding to CC #0, MO #1 corresponding to CC #1, . . . , MO #7 corresponding to CC #7 to the electronic device 101. When the electronic device 101 first reports the measurement result of MO #1 corresponding to CC #1 among the 8 MOs through the MR, the BS may configure CC #1 corresponding to MO #1 as the SpCell. Since the SpCell may be used to transmit uplink data and uplink control data as described above, it may be advantageous to use the best performance CC. The following embodiments describe a method of configuring priorities of measurement orders of the MOs and/or the measurement orders of the MOs by the electronic device 101 to allow the BS to configure a relatively good performance CC as the SpCell.

Figure 9:
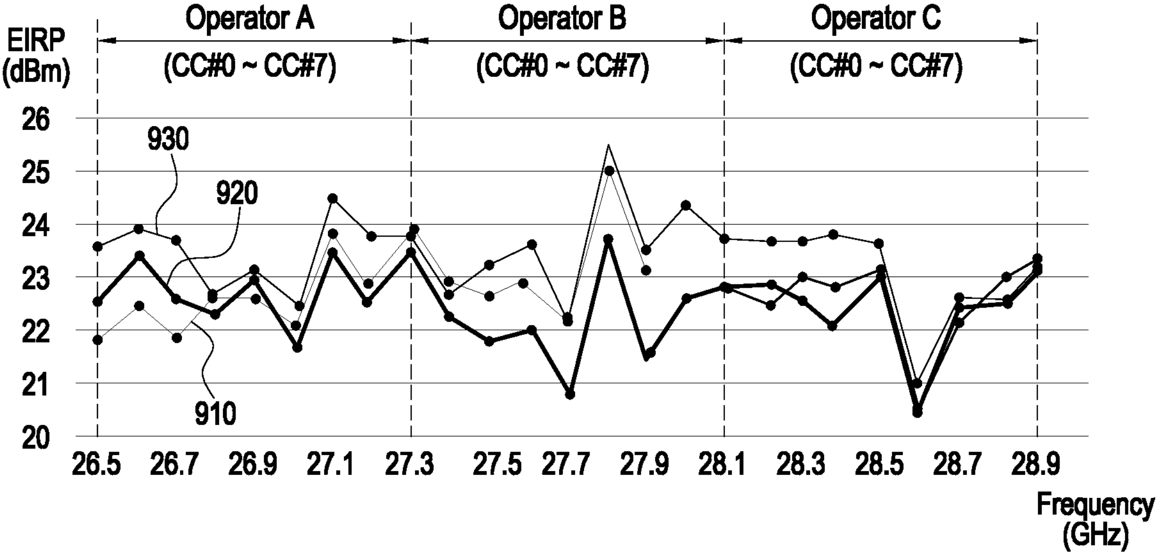
FIG. 9 is a graph illustrating EIRP for each frequency according to various embodiments.

FIG. 9 is a graph illustrating EIRP for each frequency according to various embodiments. Referring to FIG. 9, a frequency band providing a 5G communication service may use a relatively wide frequency band compared to a frequency band providing an LTE communication service. For example, the frequency band providing the 5G communication service may use the bandwidth of 800 MHz as the entire service bandwidth as illustrated in FIGS. 6 and 7, and 100 MHz may be allocated to each CC when CA is supported. Referring to FIG. 9, each electronic device 101 may have different transmission and reception performance for respective 8 CCs among the frequency band of 800 MHz allocated to respective operators according to a device characteristic. In the following description, effective isotropic radiated power (EIRP) is described as an example of the transmission and reception performance, the but the disclosure is not limited thereto. For example, referring to FIG. 9, EIRP may be different for 8 CCs provided to respective operators. Further, respective electronic devices (for example, electronic device A 910, electronic device B 920, and electronic device C 930) may have different EIRP.

Figure 10:
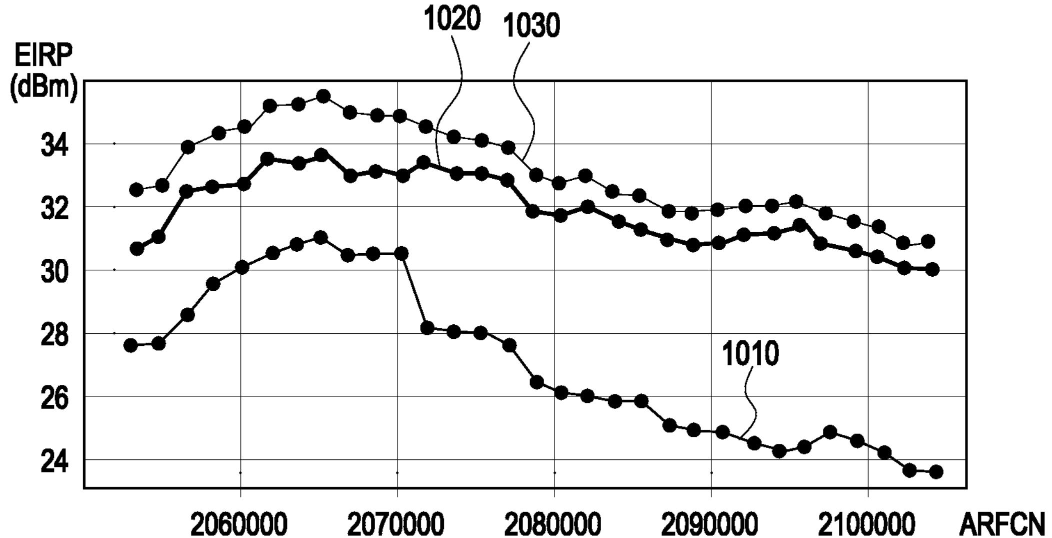
FIG. 10 is a graph illustrating EIRP for each ARFCN according to various embodiments.

FIG. 10 is a graph illustrating EIRP for each ARFCN according to various embodiments. Referring to FIG. 10, similar to the description made with reference to FIG. 9, EIRP may be different for each frequency (for example, each ARFCN) corresponding to each MO. For example, EIRP may be different for each antenna (for example, H-pol antenna 1010, V-pol antenna 1020, or VH integrated antenna 1030 (for example, antennas 248 of FIG. 2A or 2B)) even within the same electronic device 101. According to various embodiments, the EIRP may be measured for each frequency when the electronic device 101 is manufactured or released and stored in the memory 130 within the electronic device 101 or the memory within the integrated communication processor 260 or pre-stored information may be updated.

In the following various embodiments, methods of configuring measurement priorities of MOs and/or reporting priorities of MRs to select a CC having relatively higher EIRP as an SpCell on the basis of the EIRP are described.

Figure 11:
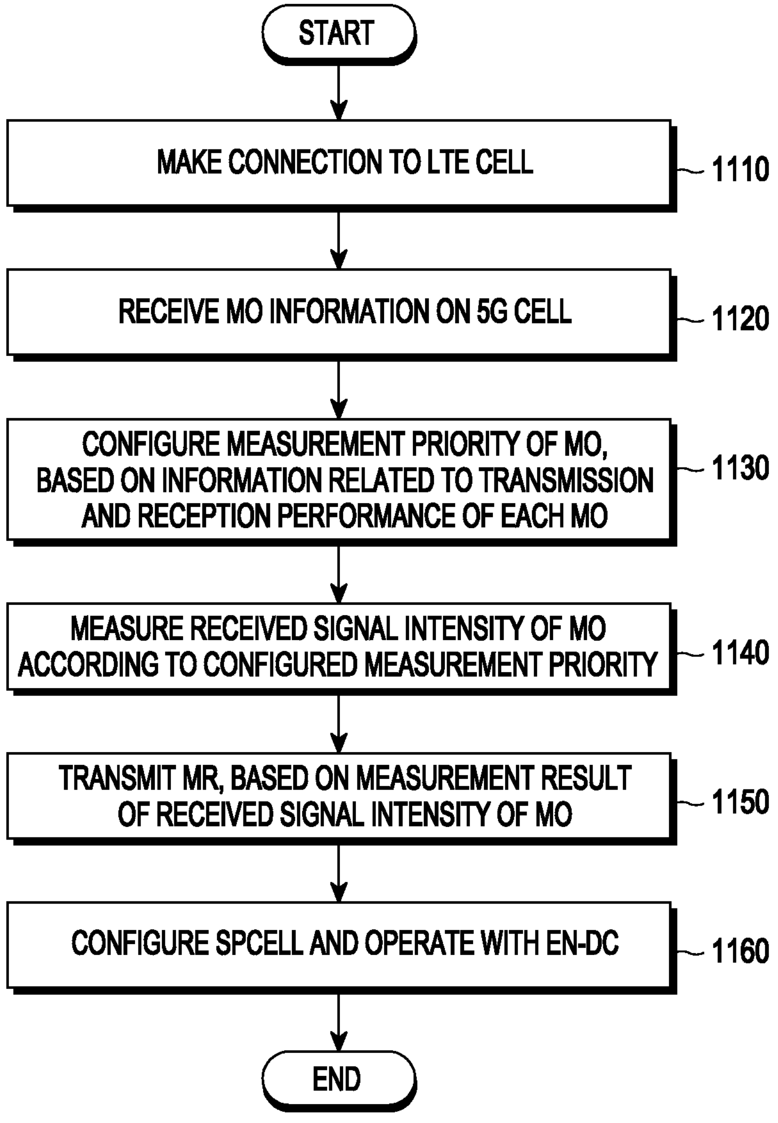
FIG. 11 is a flowchart illustrating an example method of operating an electronic device according to various embodiments.

FIG. 11 is a flowchart illustrating an example method of operating an electronic device according to various embodiments. Operations illustrated in FIG. 11 may be performed by at least one element of the electronic device 101 (for example, the processor 120 of FIG. 1, the wireless communication module 192 of FIG. 1, the first communication processor 212 of FIG. 2A, and/or the integrated communication processor 260 of FIG. 2B).

Referring to FIG. 11, according to various embodiments, the electronic device 101 may be connected to an LTE cell (or an LTE BS) in operation 1110.

According to various embodiments, the electronic device 101 may receive measurement object (MO) information for a 5G cell (or a 5G BS) in operation 1120. Each MO included in the MO information may correspond to each of a plurality of CCs when the electronic device 101 is connected to the 5G communication network and operates with CA as described above with reference to FIG. 8. For example, the MO information may include an event B1 as the reporting criterion as shown in [Table 2] above and may be transmitted from the BS (for example, eNB) to the electronic device 101 through an RRC connection reconfiguration message.

According to various embodiments, the electronic device 101 may configure priorities of measurement of MOs on the basis of information related to transmission and reception performance for each MO in operation 1130. The information related to the transmission and reception performance may correspond to effective isotropic radiated power (EIRP) but is not limited thereto. For example, as illustrated in FIG. 9, the plurality of CCs which can operate with CA may have different EIRP. According to various embodiments, the electronic device 101 may configure priorities of measurement of MOs on the basis of the EIRP. For example, the electronic device 101 may configure the MO having relatively higher EIRP to have a higher measurement priority.

According to various embodiments, the electronic device 101 may measure received signal intensity for at least one MO according to the priorities of respective MOs configured in operation 1140. For example, when the MO is an MO for a network supporting an mmWave band in the 5G communication network, the electronic device 101 may measure the received signal intensity through a beam generated through at least one beamforming antenna module (For example, the third antenna module 246 of FIG. 2A). In another example, when the MO is an MO for a network supporting a sub 6 GHz band in the 5G communication network, the electronic device 101 may measure the received signal intensity through an antenna module (for example, the second antenna module 244 of FIG. 2A) supporting the sub 6 GHz band. It should be noted that various embodiments of the disclosure are described on the basis of the network supporting the mmWave band in the 5G communication network but is not limited thereto. For example, the received signal intensity may include at least one selected from reference signal received power (RSRP), received signal strength indicator (RSSI), reference signal received quality (RSRQ), and/or signal to interference plus noise ratio (SINR).

According to various embodiments, the electronic device 101 may measure the received signal intensity for at least one MO according to the configured priorities and transmit the MR on the basis of the measurement result of the received signal intensity in operation 1150. For example, when the received signal intensity measured for a specific MO is higher than or equal to a first threshold value (for example, −60 dBm), the MR for the corresponding MO may be transmitted to the BS (for example, the LTE BS). The BS may receive the MR transmitted from the electronic device 101 and configure a CC corresponding to the corresponding MO as an SpCell. According to various embodiments, when the received signal intensity of the measured MO according to the priorities is lower than the first threshold value (for example, −60 dBm), the received signal intensity for the MO having the next priority may be measured without transmission of the MR for the corresponding. For example, operation 1140 and operation 1150 of FIG. 11 may be repeatedly performed until the MO higher than or equal to the first threshold value is identified, and a detailed embodiment thereof is described below with reference to FIG. 13. According to various embodiments, when the number of MOs having measured received signal intensities higher than or equal to a threshold value is plural, it is possible to configure a CC having relatively good transmission and reception performance as the SpCell by allowing an MO corresponding to the CC having the relatively good transmission and reception performance to preferentially transmit an MR.

According to various embodiments, the electronic device 101 may receive information on the SpCell configuration from the BS and access the 5G BS on the basis of the information on the SpCell, so as to operate with EN-DC in operation 1160. For example, the electronic device 101 may access the 5G communication network by the SpCell by operation 517 to operation 519 of FIG. 5 by the BS (for example, LTE BS (eNB)). When the electronic device 101 accesses the 5G communication network, the electronic device 101 may operate with EN-DC.

Figure 12:
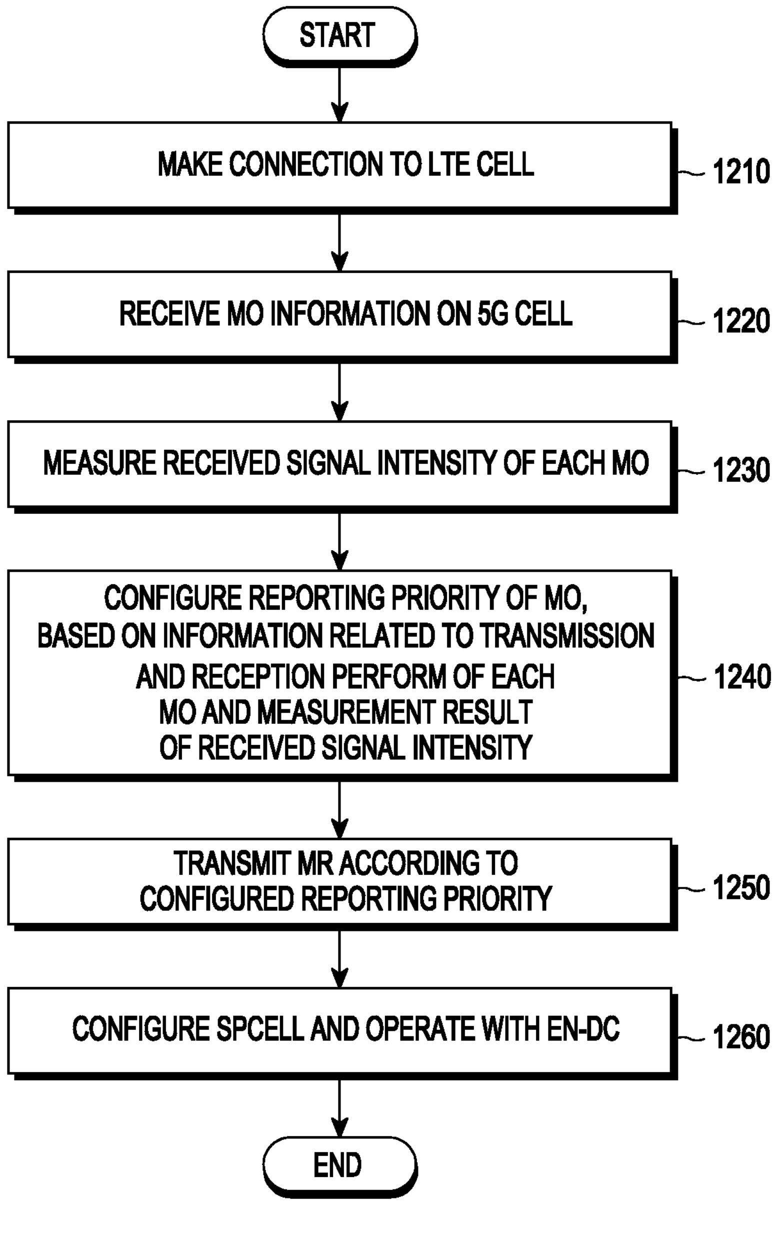
FIG. 12 is a flowchart illustrating an example method of operating an electronic device according to various embodiments.

FIG. 12 is a flowchart illustrating an example method of operating an electronic device according to various embodiments.

Operations illustrated in FIG. 12 may be performed by at least one element of the electronic device 101 (at least one of the processor 120 of FIG. 1, the wireless communication module 192 of FIG. 1, the first communication processor 212 of FIG. 2A, and/or the integrated communication processor 260 of FIG. 2B).

Referring to FIG. 12, according to various embodiments, the electronic device 101 may be connected to an LTE cell (or LTE BS) in operation 1210.

According to various embodiments, the electronic device 101 may receive measurement object (MO) information for a 5G cell (or a 5G BS) in operation 1220. Each MO included in the MO information may correspond to each of a plurality of CCs when the electronic device 101 is connected to the 5G communication network and operates with CA as described above with reference to FIG. 8. For example, the MO information may include an event B1 as the reporting criterion as shown in [Table 2] above and may be transmitted from the BS (for example, eNB) to the electronic device 101 through an RRC connection reconfiguration message.

According to various embodiment, the electronic device 101 may measure received signal intensity for each MO in operation 1230. For example, the received signal intensity may include at least one of reference signal received power (RSRP), received signal strength indicator (RSSI), reference signal received quality (RSRQ), and/or signal to interference plus noise ratio (SINR).

According to various embodiments, the electronic device 101 may configure a reporting priority of the MR including the measurement result of the MO on the basis of at least information related to transmission and reception performance for each MO and the measurement result of the received signal intensity in operation 1240. The information related to the transmission and reception performance may correspond to effective isotropic radiated power (EIRP) but is not limited thereto. For example, as illustrated in FIG. 9, the plurality of CCs which can operate with CA may have different EIRP. According to various embodiments, the electronic device 101 may configure a reporting priority of the MR on the basis of the EIRP. For example, the electronic device 101 may configure the MR for the MO having relatively higher EIRP to be preferentially reported to the BS.

Thereafter, according to various embodiments, an example embodiment of configuring the reporting priority of the MR on the basis of information related to the transmission and reception performance of each MO and the measurement result of the received signal intensity is described, but the disclosure is not limited to various embodiments described below. In the following description, for convenience of description, the case in which the number of MOs is two (for example, the case in which 2CCs are configured) is described, but the same or similar application may be used for the case in which the number of CCs is three or more through repetitive performance of the following operation.

For example, parameters for determining priorities of two MOs of which received signal intensity is measured may be configured. For convenience of description, a value for an MO having the good performance for each frequency among two MOs is indicated by a high performance MO (HPMO) and a value for an MO having relatively bad performance is indicated by low performance MO (LPMO). For example, the parameters may include $RSRP_{HPMO}$, $RSRP_{LPMO}$, $EIRP_{HPMO}$, $EIRP_{LPMO}$, and performance difference (PD). The $RSRP_{HPMO}$ may indicate RSPR for the HPMO among two MO, the $RSRP_{LPMO}$ may indicate RSRP for the LPMO among two MOs, the $EIRP_{HPMO}$ may indicate EIRP of the HPMO among two MOs, and the $EIRP_{LPMO}$ may indicate EIRP of the LPMO among two MOs. The PD may indicate difference between $EIRP_{HPMO}$ and $EIRP_{LPMO}$.

According to various embodiments, when it is likely to use maximum transmission power (Tx max power) of the electronic device in a weak electric field in which all of the received signal intensities of the two MOs are relatively low, both the two MOs have a high probability to use the same transmission power (for example, 23 dBm) but it may be advantageous to configure an MO having a relatively better radiation characteristic (for example, higher EIRP) in the corresponding frequency to have a higher priority. Accordingly, among the two MOs, the HPMO may be configured to have a higher priority than the LPMO in the above condition.

According to various embodiments, when all of the two MOs have the received signal intensities which are not lower than a preset specific threshold and the received signal intensity ($RSRP_{HPMO}$) of the HPMO is higher than the received signal intensity ($RSRP_{LPMO}$) of the LPMO, the performance for each frequency and the actual received signal intensity of the HPMO are higher than those of the LPMO, and thus the HPMO may be configured to have a higher priority than the LPMO.

According to various embodiments, when the LPMO has the higher received signal intensity but difference between received signal intensities is equal to or smaller than the PD, the HPMO may be configured to have a higher priority. For example, when it is assumed that the two MOs have the same transmission and reception performance, it may be advantageous to use lower power by the received signal intensity difference. For example, when the RSRP signal intensity difference is 2 dB, transmission power lower by 2 dB may be used. On the other hand, when there is difference in transmission and reception performance between the two MOs, the MO having the bad performance may obtain the same performance only if higher power by the corresponding performance difference is used. For example, when the performance difference between the two MOs is 2 dBm, the same performance can be obtained only if the MO having the bad performance with the same received signal intensity increases transmission power by 2 dB. Accordingly, when the LPMO has the higher received signal intensity but the difference between received signal intensities is smaller than the PD, it corresponds to the case in which the loss is greater than the gain on the basis of comparison between the corresponding gain and loss, and thus the HPMO may be configured to have a higher priority than the LPMO.

According to various embodiments, when the LPMO has the higher received signal intensity and difference between received signal intensities is larger than PD, corresponds to the case in which the gain is greater than the loss on the basis of comparison between the corresponding gain and loss, and thus the LPMO may be configured to have a higher priority than the MPMO. As described above, it is possible to determine reporting priorities of MRs for all MOs by repeating the operation for three or more MOs.

According to various embodiments, when the 5G communication network is a network supporting an mmWave band, the electronic device 101 may measure the reception intensity using a beam generated through at least one antenna module (for example, the third antenna module 246 of FIG. 2A). In an embodiment, the RSRP may be not a reception intensity measured by the best beam of the electronic device. For example, when the number of beams of the electronic device is 10 and an SSB transmission period of the MO for measuring the received signal intensity is 20 ms, a time of 200 ms (20×10) may be needed per MO. Accordingly, in order to reduce the corresponding time, it is possible to measure the reception intensity using only some beams without measuring all of the 10 beams of the electronic device.

Figure 16:
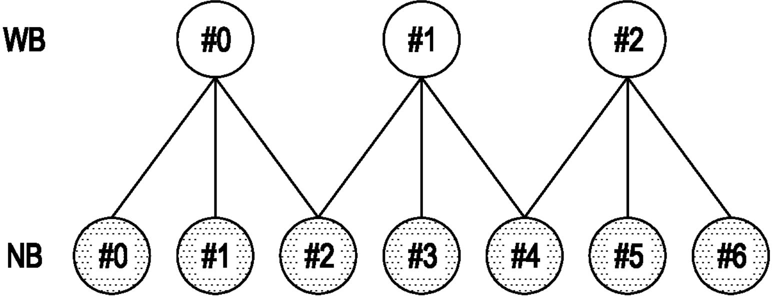
FIG. 16 is a diagram illustrating a hierarchical structure of a reception beam according to various embodiments.

According to various embodiments as illustrated in FIG. 16, when a hierarchical structure of a beam is configured, an RSRP value may be measured by a relatively small number of wide beams in order to reduce a measurement time between wide beams (For example, relatively wide beams) and narrow beams (for example, relatively narrow beams). Accordingly, $RSRP_{HPMO}$ and $RSRP_{LPMO}$ are measurement results by the wide beams rather than the optimal narrow beams of the electronic device 101, and thus the corresponding values need to be corrected. For example, when the value measured by the corresponding wide beam is −80 dBm, the corresponding value may be selected after being changed to −77 dBm if a gain difference from the narrow beam in the hierarchical structure is 3 dB. Since the gain difference may be different for each frequency, RSRP between MOs may be compared by applying different compensation according to the frequency band of the MO.

Figure 15:
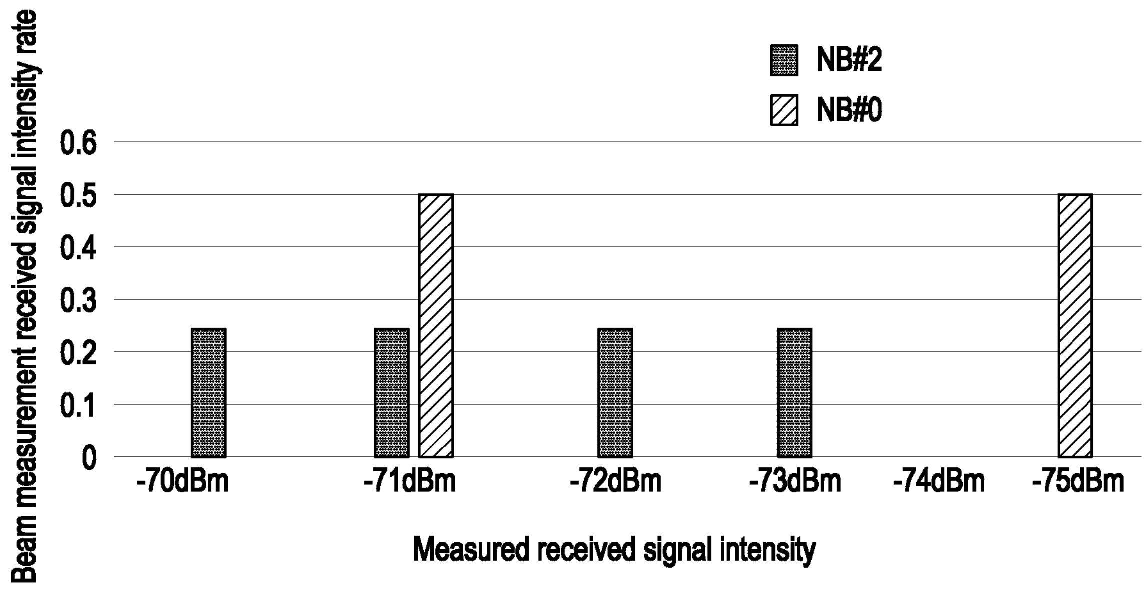
FIG. 15 is a graph illustrating distribution of received signal intensities of a plurality of reception beams according to various embodiments.

According to various embodiments, when the electronic device 101 stores the result value measured by a plurality of reception beams for respective MOs, reporting priorities of MRs of the MOs may be configured on the basis of the average of measurement values for respective reception beams for the MOs. For example, as illustrated in FIG. 15, characteristics of reception beams for respective MOs may be different. For example, while an electric field state higher than or equal to a predetermined level can be secured for a plurality of reception beams with respect to a specific MO, an electric field state for stable reception can be secured only for a specific reception beam with respect to other MOs. In the case of an MO having an electric field state biased towards a specific reception beam, normal communication can be guaranteed only when the electronic device 101 continuously accurately selects the reception beam. For example, since control data is mainly transmitted and received in a specific CC corresponding to the SpCell in most time, the electronic device may select the CC which is not dependent on the specific reception beam and can secure the stable electric field state as the SpCell. For example, when determining a reporting priority of each MO, the electronic device 101 may determine the same in consideration of an average electric field state for a plurality of reception beams.

According to various embodiments, the electronic device 101 may measure the received signal intensity for each MO and transmit MRs to the BS according to the configured reporting priorities in operation 1250. For example, the electronic device may transmit MRs for at least one MOs satisfying the configured reporting criterion (for example, having the measured received signal intensity higher than or equal to a second threshold value (for example, −120 dBm)) to the BS according to the priorities. The BS may receive the MR transmitted from the electronic device 101 and configure a CC corresponding to the corresponding MO as an SpCell. According to various embodiments, it is possible to configure the CC having the relatively good transmission and reception performance as the SpCell by allowing the MO corresponding to the CC having the relatively good transmission and reception performance to preferentially transmit the MR.

According to various embodiments, the electronic device 101 may receive information on the SpCell configuration from the BS and access the 5G BS on the basis of the information on the SpCell, so as to operate with EN-DC in operation 1260. For example, the electronic device 101 may access the 5G communication network by the SpCell by operation 517 to operation 519 of FIG. 5 by the BS (for example, LTE BS (eNB)). When the electronic device 101 accesses the 5G communication network, the electronic device 101 may operate with EN-DC.

Figure 13:
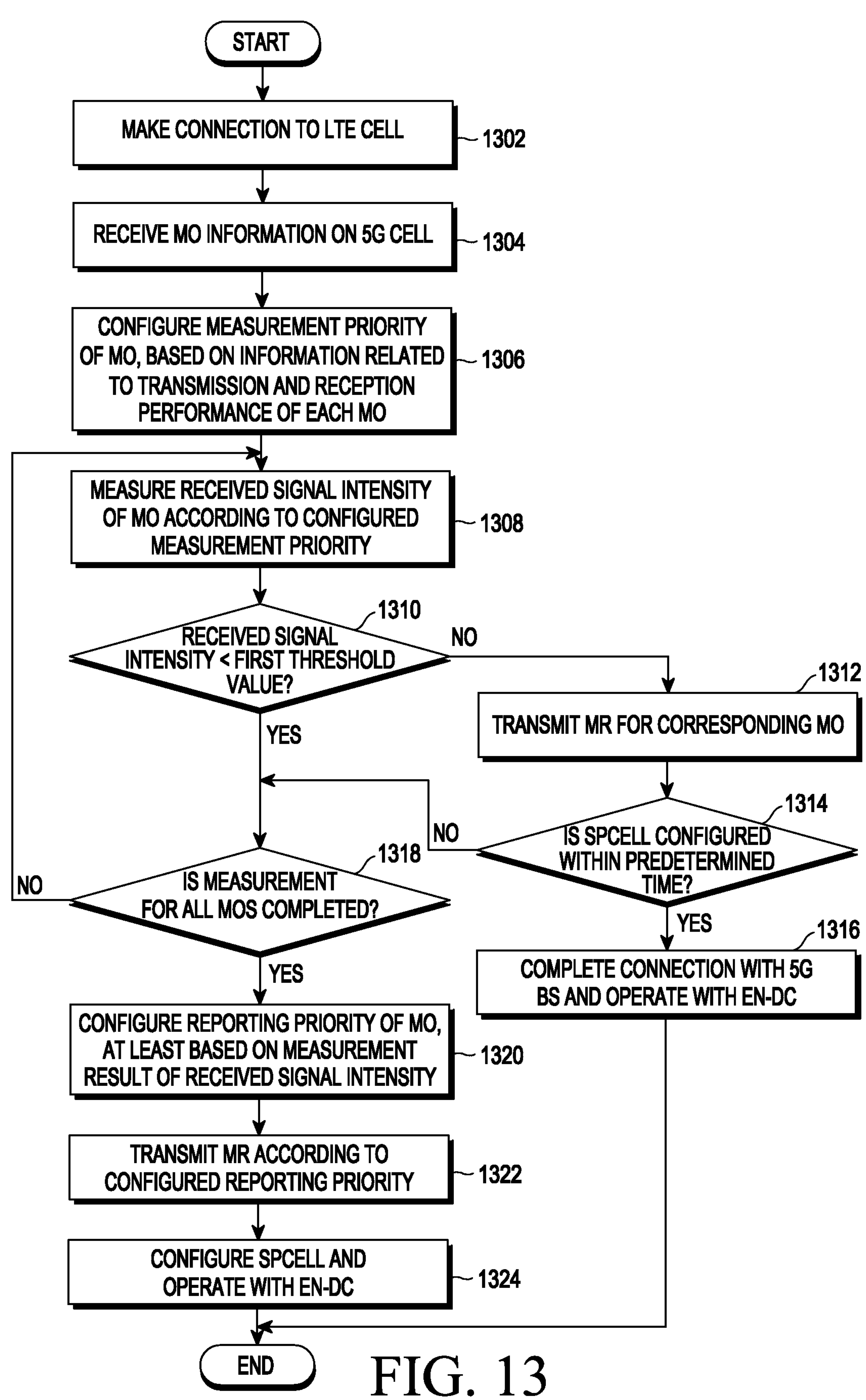
FIG. 13 is a flowchart illustrating an example method of operating an electronic device according to various embodiments.

FIG. 13 is a flowchart illustrating an example method of operating an electronic device according to various embodiments.

Operations illustrated in FIG. 12 may be performed at least one element of the electronic device 101 (at least one of the processor 120 of FIG. 1, the wireless communication module 192 of FIG. 1, the first communication processor 212 of FIG. 2A, and/or the integrated communication processor 260 of FIG. 2B).

Referring to FIG. 13, according to various embodiments, the electronic device 101 may be connected to an LTE cell (or an LTE BS) in operation 1302.

According to various embodiments, the electronic device 101 may receive measurement object (MO) information for a 5G cell (or a 5G BS) in operation 1304. Each MO included in the MO information may correspond to each of a plurality of CCs when the electronic device 101 is connected to the 5G communication network and operates with CA as described above, for example, with reference to FIG. 8. For example, the MO information may include an event B1 as the reporting criterion as shown in [Table 2] above and may be transmitted from the BS (for example, eNB) to the electronic device 101 through an RRC connection reconfiguration message.

According to various embodiments, the electronic device 101 may configure priorities of measurement of MOs on the basis of information related to transmission and reception performance for each MO in operation 1306. The information related to the transmission and reception performance may correspond to effective isotropic radiated power (EIRP) but is not limited thereto. For example, as illustrated in FIG. 9, the plurality of CCs which can operate with CA may have different EIRP. According to various embodiments, the electronic device 101 may configure priorities of measurement of MOs on the basis of the EIRP. For example, the electronic device 101 may configure the MO having relatively higher EIRP to have a higher measurement priority.

According to various embodiments, the electronic device 101 may measure the received signal intensity for the MO according to the priority of each MO configured in operation 1308. For example, the received signal intensity may include at least one of reference signal received power (RSRP), received signal strength indicator (RSSI), reference signal received quality (RSRQ), and/or signal to interference plus noise ratio (SINR).

According to various embodiments, when the measured received signal intensity of the corresponding MO is greater than or equal to a first threshold value (for example, −60 dBm) according to the measurement priority in operation 1310 (No of operation 1310), the electronic device 101 may transmit the MR for the corresponding MO to the BS in operation 1312. The first threshold value may be configured on the basis of, for example, a reporting criterion. For example, the first threshold value may be configured to have a reception intensity value equal to a threshold value (for example, a second threshold value (for example, −120 dBm) related to the reporting criterion or higher than the threshold value related to the reporting criterion. For example, when the reporting criterion is B 1, the first threshold value may be configured as −60 dBm, and the second threshold value related to the event B1 may be configured as −120 dBm. When the SpCell is configured within a predetermined time in operation 1314 (Yes of operation 1314), the electronic device 101 may complete the connection with the 5G BS and operate with EN-DC in operation 1316. When no SpCell is configured within a predetermined time in operation 1314 (No of operation 1314), the electronic device 101 may measure the signal intensity for the MO having the next priority in operation 1318.

According to various embodiments, when the received signal intensity of the corresponding MO measured according to the measurement priority is lower than the first threshold value (for example, −60 dBm) in operation 1310 (Yes of operation 1310), the electronic device 101 may identify whether all MOs are completely measured in operation 1318. When not all the MOs are completely measured on the basis of the identification result (No of operation 1318), the electronic device may proceed to operation 1308 and measure the received signal intensity for the MO having the next priority.

When all MOs are completely measured on the basis of the identification result (Yes of operation 1318), the electronic device may configure an MR reporting priority for the MO on the basis of at least the measurement result of the received signal intensity in operation 1320. For example, the electronic device 101 may configure the reporting priority of the MR including the measurement result of the MO on the basis of at least information related to the transmission and reception performance for each MO and the measurement result of the received signal intensity as illustrated, for example, in FIG. 12. The information related to the transmission and reception performance may correspond to effective isotropic radiated power (EIRP) but is not limited thereto. For example, as illustrated, for example, in FIG. 9, the plurality of CCs which can operate with CA may have different EIRP. According to various embodiments, the electronic device 101 may configure a reporting priority of the MR on the basis of the EIRP. For example, the electronic device 101 may configure the MR for the MO having relatively higher EIRP to be preferentially reported to the BS.

According to various embodiments, the electronic device 101 may transmit the MR to the BS according to the configured reporting priority in operation 1322. For example, the electronic device may transmit the MR to the BS according to the reporting priority for at least one MO satisfying the configured reporting criterion (for example, measured received signal intensity higher than or equal to a second threshold value (for example, −120 dBm). The BS may receive the MR transmitted from the electronic device 101 and configure a CC corresponding to the corresponding MO as an SpCell. According to various embodiments, the CC having relatively good transmission and reception performance may be configured as the SpCell by making the MO corresponding to the CC having the relatively good transmission and reception performance preferentially transmit the MR.

According to various embodiments, the electronic device 101 may receive information on the SpCell configuration from the BS and access the 5G BS on the basis of the information on the SpCell, so as to operate with EN-DC in operation 1324. For example, the electronic device 101 may access the 5G communication network by the SpCell by operation 517 to operation 519 of FIG. 5 by the BS (for example, LTE BS (eNB)). When the electronic device 101 accesses the 5G communication network, the electronic device 101 may operate with EN-DC.

Figure 14:
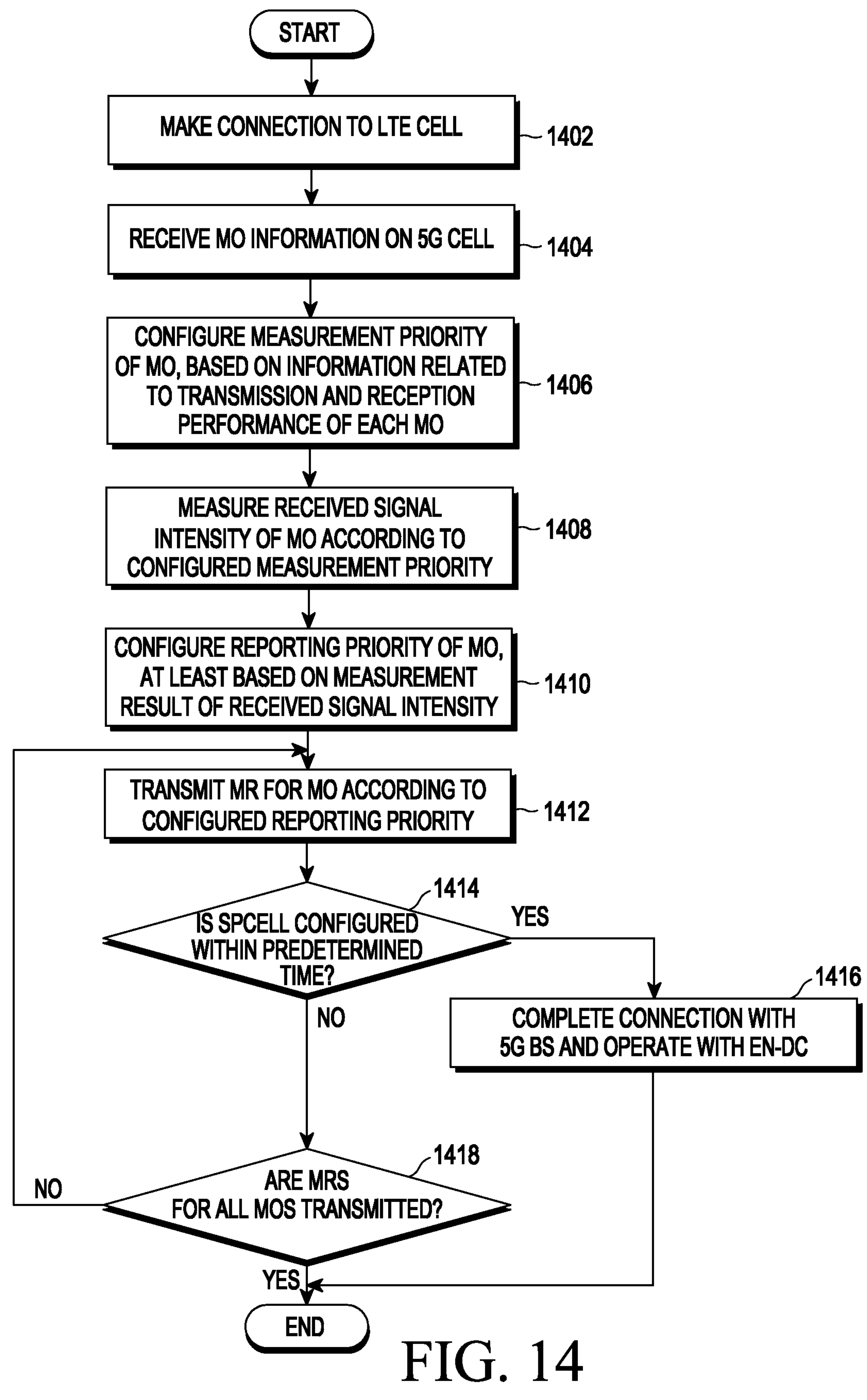
FIG. 14 is a flowchart illustrating an example method of operating an electronic device according to various embodiments.

FIG. 14 is a flowchart illustrating an example method of operating an electronic device according to various embodiments.

Operations illustrated in FIG. 12 may be performed at least one element of the electronic device 101 (for example, at least one of the processor 120 of FIG. 1, the wireless communication module 192 of FIG. 1, the first communication processor 212 of FIG. 2A, and/or the integrated communication processor 260 of FIG. 2B).

Referring to FIG. 14, according to various embodiments, the electronic device 101 may be connected to an LTE cell (or LTE BS) in operation 1402.

According to various embodiments, the electronic device 101 may receive measurement object (MO) information for a 5G cell (or a 5G BS) in operation 1404. Each MO included in the MO information may correspond to each of a plurality of CCs when the electronic device 101 is connected to the 5G communication network and operates with CA as described above with reference to FIG. 8. For example, the MO information may include an event B1 as the reporting criterion as shown in [Table 2] above and may be transmitted from the BS (for example, eNB) to the electronic device 101 through an RRC connection reconfiguration message.

According to various embodiments, the electronic device 101 may configure priorities of measurement of MOs on the basis of information related to transmission and reception performance for each MO in operation 1406. The information related to the transmission and reception performance may correspond to effective isotropic radiated power (EIRP) but is not limited thereto. For example, as illustrated in FIG. 9, the plurality of CCs which can operate with CA may have different EIRP. According to various embodiments, the electronic device 101 may configure priorities of measurement of MOs on the basis of the EIRP. For example, the electronic device 101 may configure the MO having relatively higher EIRP to have a higher measurement priority.

According to various embodiments, the electronic device 101 may measure received signal intensity for the MO according to the configured priority of the MO in operation 1408. For example, the received signal intensity may include at least one of reference signal received power (RSRP), received signal strength indicator (RSSI), reference signal received quality (RSRQ), and/or signal to interference plus noise ratio (SINR).

According to various embodiments, the electronic device 101 may configure the reporting priority of the MR for the MO on the basis of at least one the measurement result of the received signal intensity in operation 1410. For example, the electronic device 101 may configure the reporting priority of the MR including the measurement result of the MO on the basis of at least information related to the transmission and reception performance for each MO and the measurement result of the received signal intensity. The information related to the transmission and reception performance may correspond to effective isotropic radiated power (EIRP) but is not limited thereto. For example, as illustrated in FIG. 9, the plurality of CCs which can operate with CA may have different EIRP. According to various embodiments, the electronic device 101 may configure a reporting priority of the MR on the basis of the EIRP. For example, the electronic device 101 may configure the MR for the MO having relatively higher EIRP to be preferentially reported to the BS.

According to various embodiments, the electronic device 101 may transmit the MR to the BS according to the configured reporting priority in operation 1412. For example, the electronic device may transmit the MR to the BS according to the reporting priority for the MO satisfying the configured reporting criterion (for example, the measured received signal intensity higher than or equal to the second threshold value (for example, −120 dBm)). For example, when the configuration of the SpCell is completed within a predetermined time in operation 1414 after the MR for the specific MO is transmitted according to the priority (Yes of operation 1414), the electronic device may complete the connection with the 5G BS and operate with EN-DC in operation 1416.

According to various embodiments, when the configuration of the SpCell is not completed within a predetermined time in operation 1414 after the MR for the specific MO is transmitted according to the priority (No of operation 1414), the electronic device may identify whether MRs for all MOs are transmitted in operation 1418. When MRs for all MOs are not transmitted on the basis of the identification result (No of operation 1418), the electronic device may proceed to operation 1412 and transmit the MR for the MO having the next priority. When MRs for all MOs are transmitted on the basis of the identification result (Yes of operation 1418), the electronic device may end the operation for MR transmission.

Hereinafter, a detailed example for the above-described embodiments is described.

For example, the electronic device 101 may receive a configuration for a plurality of MOs as shown in [Table 3] below after the connection with the LTE cell.

TABLE 3

| MO | Band | Frequency | MR |
|---|---|---|---|
| 0 | 261 | CC#0 | B1 |
| 1 | 261 | CC#1 | B1 |
| 2 | 261 | CC#2 | B1 |
| 3 | 261 | CC#3 | B1 |
| 4 | 261 | CC#4 | B1 |
| 5 | 261 | CC#5 | B1 |
| 6 | 261 | CC#6 | B1 |
| 7 | 261 | CC#7 | B1 |

According to various embodiments, a frequency of the MO may include not only a band of N261 (28 GHz) but also a band of M260 (39 GHz). According to various embodiments, the electronic device may select one band from among the band of N261 and the band of N260 in consideration of the transmission and reception performance of the electronic device. Hereinafter, it is assumed that the electronic device 101 selects the band of N261.

Thereafter, the measurement priority of the received signal intensity of the MO may be determined as shown in [Table 4] below according to the hardware transmission and reception performance (for example, EIRP) for each frequency stored in the electronic device 101.

TABLE 4

| MO | Frequency | Performance (gain) | Priority |
|---|---|---|---|
| 0 | CC#0 | 5 | 1 |
| 1 | CC#1 | 0 | 8 |
| 2 | CC#2 | 1 | 6 |
| 3 | CC#3 | 1 | 7 |
| 4 | CC#4 | 2 | 5 |
| 5 | CC#5 | 3 | 3 |
| 6 | CC#6 | 4 | 2 |
| 7 | CC#7 | 3 | 4 |

In [Table 4] above, the performance may be indicated by a gain (for example, EIRP difference) for each MO on the basis of the smallest EIRP value (gain=0) in frequencies configured as MOs. According to various embodiments, the electronic device 101 may measure the received signal intensity of the MO according to the determined priority. For example, a threshold value for performing the MR right after measurement of the received signal intensity of the MO is configured as −60 dBm and the received signal intensity of each MO does not exceed the corresponding value. Accordingly, the electronic device 101 may measure received signal intensities of all MOs as shown in [Equation 5] below.

TABLE 5

| MO | Frequency | Performance (gain) | Received signal intensity (dBm) |
|---|---|---|---|
| 0 | CC#0 | 5 | −71 |
| 1 | CC#1 | 0 | −83 |
| 2 | CC#2 | 1 | −69 |
| 3 | CC#3 | 1 | −75 |
| 4 | CC#4 | 2 | −77 |
| 5 | CC#5 | 3 | −74 |
| 6 | CC#6 | 4 | −69 |
| 7 | CC#7 | 3 | −72 |

Referring to [Table 5] above, the electronic device may first perform the MR of the MO for CC #6. In comparison between CC #2 and CC #6 having the best received signal intensity, the performance of CC #6 is better by 3 dB, and thus CC #6 has the highest priority of the MR, and in comparison between CC #0 and CC #6 having the best performance, the frequency performance (gain) difference of the UE is 1 dB but the received signal intensity difference is 2 dB, and thus CC #6 has a higher priority. All MR priorities may be configured as shown in [Table 6] below.

TABLE 6

| MO | Frequency | Performance (gain) | Received signal intensity (dBm) | Priority |
|---|---|---|---|---|
| 0 | CC#0 | 5 | −71 | 2 |
| 1 | CC#1 | 0 | −83 | 8 |
| 2 | CC#2 | 1 | −69 | 3 |
| 3 | CC#3 | 1 | −75 | 6 |
| 4 | CC#4 | 2 | −77 | 7 |
| 5 | CC#5 | 3 | −74 | 5 |
| 6 | CC#6 | 4 | −69 | 1 |
| 7 | CC#7 | 3 | −72 | 4 |

The electronic device 101 may transmit MRs according to the configured priorities in [Table 6] above and determine whether to transmit an additional MR according to an SpCell configuration.

An electronic device (for example, the electronic device 101) according to various example embodiments may include: a memory (for example, the memory 130) and at least one communication processor (for example, the processor 120 of FIG. 1, the wireless communication module 192 of FIG. 1, the first communication processor 212 of FIG. 2A, and the integrated communication processor 260 of FIG. 2B), wherein the at least one communication processor may be configured to: identify a plurality of measurement objects (MOs) configured to measure downlink performance of a second communication network while being connected to a first base station (BS) of a first communication network, identify measurement priorities of the plurality of MOs configured at least based on information related to transmission and reception performance of signals having frequencies corresponding to the plurality of MOs stored in the memory, measure received signal intensities of at least one MO from signals transmitted from a second BS of the second communication network, based on the measurement priorities of the plurality of MOs, and control the electronic device to transmit at least one measurement report (MR) to the first BS of the first communication network, based on a measurement result of the received signal intensities for the at least one MO.

According to various example embodiments, the at least one communication processor may be configured to receive information on the plurality of MOs from the BS of the first communication network.

According to various example embodiments, the information related to the transmission and reception performance of the signals having the frequencies corresponding to the plurality of MOs may include effective isotropic radiated power (EIRP).

According to various example embodiments, each of the plurality of MOs may correspond to each of a plurality of component carriers (CCs) configured for carrier aggregation (CA).

According to various example embodiments, the received signal intensity may include at least one of reference signal received power (RSRP), received strength signal indicator (RSSI), reference signal received quality (RSRQ), or signal to interference plus noise ratio (SINR).

According to various example embodiments, the at least one communication processor may be configured to: control the electronic device to transmit MRs for the plurality of MOs, based on the measurement result of the received signal intensities, based on a connection with the second communication network failing, based on a result of attempt to make the connection with the second communication network according to the transmitted MRs, identify reporting priorities of the plurality of MOs, and control the electronic device to transmit MRs for at least one MO, based on the reporting priories of the plurality of MOs.

According to various example embodiments, the at least one communication processor may be configured to: identify reporting priorities of the plurality of MOs configured by the second BS and received through the first BS, at least based on the information related to the transmission and reception performance and the measurement result of the received signal intensities, and control the electronic device to transmit MRs for at least one MO, based on the reporting priorities of the plurality of MOs.

According to various example embodiments, the at least one communication processor may be configured to, based on a message for the connection with the second communication network not being received within a specified time after an MR for a first MO is transmitted, based on the reporting priorities of the plurality of MOs, control the electronic device to transmit an MR for a second MO.

According to various example embodiments, the at least one communication processor may be configured control the electronic device to attempt access to the second BS of the second communication network in response to reception of a message for the connection with the second communication network within a specified time after an MR for a first MO is transmitted, based on the reporting priorities of the plurality of MOs.

According to various example embodiments, the at least one communication processor may be configured to control the electronic device to transmit an MR corresponding to a first MO, based on identifying that a received signal intensity for the first MO exceeds a specified threshold value, based on the measurement result of the received signal intensities for the at least one MO.

A method of reporting measurement for frequency selection by an electronic device according to various example embodiments may include: identifying a plurality of measurement objects (MOs) configured to measure downlink performance of a second communication network while being connected to a first base station (BS) of a first communication network, identifying measurement priorities of the plurality of MOs configured at least based on information related to transmission and reception performance of signals having frequencies corresponding to the plurality of MOs stored in a memory, measuring received signal intensities of at least one MO from signals transmitted from a second BS of the second communication network, based on the measurement priorities of the plurality of MOs, and transmitting at least one measurement report (MR) to the first BS of the first communication network, based on a measurement result of the received signal intensities for the at least one MO.

According to various example embodiments, the method may include receiving information on the plurality of MOs from the BS of the first communication network.

According to various example embodiments, the information related to the transmission and reception performance of the signals having the frequencies corresponding to the plurality of MOs may include effective isotropic radiated power (EIRP).

According to various example embodiments, each of the plurality of MOs may correspond to each of a plurality of component carriers (CCs) configured for carrier aggregation (CA).

According to various example embodiments, the received signal intensity may include at least one of reference signal received power (RSRP), received strength signal indicator (RSSI), reference signal received quality (RSRQ), or signal to interference plus noise ratio (SINR).

According to various example embodiments, the method may include: transmitting MRs for the plurality of MOs, based on the measurement result of the received signal intensities, based on a connection with the second communication network failing, based on a result of attempt to make the connection with the second communication network according to the transmitted MRs, identifying reporting priorities of the plurality of Mos, and transmitting MRs for at least one MO, based on the reporting priories of the plurality of Mos.

According to various example embodiments, the method may include: \identifying reporting priorities of the plurality of MOs, at least based on the information related to the transmission and reception performance and the measurement result of the received signal intensities and transmitting MRs for at least one MO, based on the reporting priorities of the plurality of MOs.

According to various example embodiments, the method may include: based on a message for the connection with the second communication network not being received within a specified time after an MR for a first MO is transmitted, based on the reporting priorities of the plurality of MOs, transmitting an MR for a second MO.

According to various example embodiments, the method may include: based on a message for the connection with the second communication network being received within a specified time after an MR for a first MO is transmitted, based on the reporting priorities of the plurality of MOs, attempting access to the second communication network.

According to various example embodiments, the method may include: based on a received signal intensity for a first MO exceeding a specified threshold value, based on the measurement result of the received signal intensities for the at least one MO, transmitting an MR corresponding to the first MO.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the master device or task performing device). For example, a processor of the machine (e.g., the master device or task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a memory; and at least one communication processor, wherein the at least one communication processor is configured to:

identify a plurality of measurement objects (MOs) for measuring downlink performance of a second cell while being connected to a first cell;

identify measurement priorities of the plurality of MOs at least partially based on information related to performance of hardware of the electronic device for communicating wireless signals having frequencies corresponding to the plurality of MOs, stored in the memory;

measure received signal intensities of at least one MO from signals transmitted from the second cell based on the measurement priorities of the plurality of MOs; and control the electronic device to transmit at least one measurement report (MR) to the first cell, based on a measurement result of the received signal intensities for the at least one MO, wherein the information related to the performance of hardware of the electronic device for communicating the wireless signals having the frequencies corresponding to the plurality of MOs includes antenna characteristics of the electronic device.

2. The electronic device of claim 1, wherein the at least one communication processor is configured to receive information on the plurality of MOs from a third cell.

3. The electronic device of claim 1, wherein the antenna characteristics of the electronic device indicate effective isotropic radiated power (EIRP).

4. The electronic device of claim 1, wherein each of the plurality of MOs corresponds to each of a plurality of component carriers (CCs) configured for carrier aggregation (CA).

5. The electronic device of claim 1, wherein the received signal intensity comprises one of reference signal received power (RSRP), received strength signal indicator (RSSI), reference signal received quality (RSRQ), or signal to interference plus noise ratio (SINR).

6. The electronic device of claim 1, wherein the at least one communication processor is configured to:

control the electronic device to transmit MRs for the plurality of MOs, based on the measurement result of the received signal intensities;

based on a failure of a connection with the second cell, as a result of an attempt to make the connection with the second cell based on the transmitted MRs, identify reporting priorities of the plurality of MOs; and control the electronic device to transmit MRs for at least one MO, based on the reporting priorities of the plurality of MOs.

7. The electronic device of claim 1, wherein the at least one communication processor is configured to:

identify reporting priorities of the plurality of MOs configured by the second cell and received through the first cell, at least based on the information related to the performance of hardware of the electronic device for communicating the wireless signals and the measurement result of the electronic device with respect to the received signal intensities; and control the electronic device to transmit MRs for at least one MO, based on the reporting priorities of the plurality of MOs.

8. The electronic device of claim 7, wherein the at least one communication processor is configured to, based on a message for the connection with the second cell not being received within a specified time after an MR for a first MO is transmitted, based on the reporting priorities of the plurality of MOs, transmit an MR for a second MO.

9. The electronic device of claim 7, wherein the at least one communication processor is configured to control the electronic device to attempt access to the second cell in response to reception of a message for the connection with the second cell within a specified time after an MR for a first MO is transmitted, based on the reporting priorities of the plurality of MOs.

10. The electronic device of claim 1, wherein the at least one communication processor is configured to control the electronic device to transmit an MR corresponding to a first MO, based on identification that a received signal intensity for the first MO exceeds a specified threshold value, based on the measurement result of the received signal intensities for the at least one MO.

11. A method of reporting measurement for frequency selection by an electronic device, the method comprising:

identifying a plurality of measurement objects (MOs) for measuring downlink performance of a second cell while being connected to a first cell;

identifying measurement priorities of the plurality of MOs at least partially based on information related to performance of hardware of the electronic device for communicating wireless signals having frequencies corresponding to the plurality of MOs stored in a memory;

measuring received signal intensities of at least one MO from signals transmitted from the second cell, based on the measurement priorities of the plurality of MOs; and transmitting at least one measurement report (MR) to the first cell, based on a measurement result of the received signal intensities for the at least one MO, wherein the information related to the performance of hardware of the electronic device for communicating the wireless signals having the frequencies corresponding to the plurality of MOs includes antenna characteristics of the electronic device.

12. The method of claim 11, further comprising receiving information on the plurality of MOs from a third cell.

13. The method of claim 11, wherein the antenna characteristics of the electronic device indicate effective isotropic radiated power (EIRP).

14. The method of claim 11, wherein each of the plurality of MOs corresponds to each of a plurality of component carriers (CCs) configured for carrier aggregation (CA).

15. The method of claim 11, wherein the received signal intensity comprises one of reference signal received power (RSRP), received strength signal indicator (RSSI), reference signal received quality (RSRQ), or signal to interference plus noise ratio (SINR).

16. The method of claim 11, further comprising:

transmitting MRs for the plurality of MOs, based on the measurement result of the received signal intensities;

identifying, based on a failure of a connection with the second cell, as a result of an attempt to make the connection with the second cell based on the transmitted MRs, reporting priorities of the plurality of MOs; and transmitting MRs for at least one MO, based on the reporting priorities of the plurality of MOs.

17. The method of claim 11, further comprising:

identifying reporting priorities of the plurality of MOs configured by the second cell and received through the first cell, at least based on the information related to the performance of hardware of the electronic device for communicating the wireless signals and the measurement result of the electronic device with respect to the received signal intensities; and transmitting MRs for at least one MO, based on the reporting priorities of the plurality of MOs.

18. The method of claim 17, further comprising transmitting, based on a message for the connection with the second cell not being received within a specified time after an MR for a first MO is transmitted, based on the reporting priorities of the plurality of MOs, an MR for a second MO.

19. The method of claim 17, further comprising attempting access to the second cell in response to reception of a message for the connection with the second cell within a specified time after an MR for a first MO is transmitted, based on the reporting priorities of the plurality of MOs.

20. The method of claim 11, further comprising transmitting an MR corresponding to a first MO, based on identification that a received signal intensity for the first MO exceeds a specified threshold value, based on the measurement result of the received signal intensities for the at least one MO.

* * * * *